(12) United States Patent
Kulkarni et al.

(10) Patent No.: US 12,093,092 B2
(45) Date of Patent: Sep. 17, 2024

(54) HEAT TRANSFER APPARATUS FOR A COMPUTER ENVIRONMENT

(71) Applicant: Intel Corporation, Santa Clara, CA (US)

(72) Inventors: Devdatta P. Kulkarni, Olympia, WA (US); Timothy G. Hanna, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 17/568,615

(22) Filed: Jan. 4, 2022

(65) Prior Publication Data

US 2022/0137685 A1    May 5, 2022

Related U.S. Application Data

(63) Continuation of application No. 15/199,003, filed on Jun. 30, 2016, now Pat. No. 11,249,522.

(51) Int. Cl.
*G06F 1/20* (2006.01)
*F25B 21/02* (2006.01)

(52) U.S. Cl.
CPC ............... *G06F 1/20* (2013.01); *F25B 21/02* (2013.01); *G06F 1/206* (2013.01)

(58) Field of Classification Search
CPC .. F25B 21/02; F25B 21/04; G06F 1/20; G06F 1/206; H05K 7/20; H05K 7/20218;
(Continued)

(56) References Cited

U.S. PATENT DOCUMENTS 5,655,375 A    8/1997 Ju
5,964,092 A    10/1999 Tozuka et al.
(Continued)

OTHER PUBLICATIONS

Escudier, M., & Atkins, T. (2019). thermoelectric converter. In A Dictionary of Mechanical Engineering. : Oxford University Press. Retrieved Sep. 6, 2023, from https://www.oxfordreference.com/view/10.1093/acref/9780198832102.001.0001/acref-9780198832102-e-6668. (Year: 2019).*
(Continued)

*Primary Examiner* — Miguel A Diaz
(74) *Attorney, Agent, or Firm* — Schwabe, Williamson & Wyatt, P.C.

(57) ABSTRACT

Apparatuses, methods and storage medium associated with coolant systems for computer and electrical environments are disclosed herein. In embodiments, an apparatus for selectively transferring of heat within a computer environment may include a cold plate thermally coupled to a liquid line of a liquid coolant system of the computer environment, the cold plate to transfer heat to the liquid line and a thermally-conductive body to cool a component of the computer environment. The apparatus may further include a thermoelectric cooler (TEC) thermally coupled with the cold plate on a first side of the TEC and thermally coupled with the thermally-conductive body on a second side of the TEC, the TEC to increase an amount of heat transfer from the second side of the TEC to the first side of the TEC in response to energy provided to the TEC.

20 Claims, 11 Drawing Sheets

(58) Field of Classification Search
CPC ........... H05K 7/20709; H05K 7/20254; H05K 7/20263; H05K 7/20272; H05K 7/20281
See application file for complete search history.

(56) References Cited

U.S. PATENT DOCUMENTS

| | | | |
|---|---|---|---|
| 6,093,001 A | 7/2000 | Burgreen et al. | |
| 6,345,507 B1 | 2/2002 | Gillen | |
| 6,567,262 B2 | 5/2003 | Meir | |
| 6,705,089 B2 | 3/2004 | Chu et al. | |
| 7,012,807 B2 | 3/2006 | Chu et al. | |
| 7,264,359 B2 | 9/2007 | Kawahara et al. | |
| 7,866,164 B2 | 1/2011 | Rice | |
| 8,164,901 B2 | 4/2012 | Neudorfer | |
| 8,248,801 B2 | 8/2012 | Campbell et al. | |
| 8,472,182 B2 | 6/2013 | Campbell et al. | |
| 8,516,832 B2 | 8/2013 | Bhavsar et al. | |
| 8,582,298 B2 | 11/2013 | Facusse et al. | |
| 8,713,957 B2 | 5/2014 | Campbell et al. | |
| 8,797,740 B2 | 8/2014 | Campbell et al. | |
| 8,839,631 B2 | 9/2014 | Lu | |
| 8,934,244 B2 | 1/2015 | Shelnutt et al. | |
| 9,483,091 B2 | 11/2016 | Watanabe | |
| 9,795,065 B2 | 10/2017 | Shelnutt et al. | |
| 9,839,164 B2 | 12/2017 | Shelnutt et al. | |
| 9,983,641 B2 | 5/2018 | Kulkarni et al. | |
| 10,206,312 B2 | 2/2019 | Shelnutt et al. | |
| 2002/0191430 A1 | 12/2002 | Meir | |
| 2003/0188538 A1 | 10/2003 | Chu et al. | |
| 2005/0068728 A1 | 3/2005 | Chu et al. | |
| 2005/0141197 A1 | 6/2005 | Erturk et al. | |
| 2005/0146850 A1 | 7/2005 | Meir | |
| 2005/0147500 A1 | 7/2005 | Sauciuc | |
| 2005/0285228 A1 | 12/2005 | Sugawara | |
| 2006/0138905 A1 | 6/2006 | Gonzales et al. | |
| 2006/0187639 A1 | 8/2006 | Carswell | |
| 2006/0227504 A1 | 10/2006 | Chen et al. | |
| 2006/0244926 A1 | 11/2006 | Shih et al. | |
| 2007/0157628 A1 | 7/2007 | Onoue | |
| 2007/0163270 A1 | 7/2007 | Chien et al. | |
| 2008/0013283 A1 | 1/2008 | Gilbert et al. | |
| 2008/0087024 A1 | 4/2008 | Hood et al. | |
| 2008/0229759 A1 | 9/2008 | Ouyang | |
| 2008/0245398 A1* | 10/2008 | Bell | H10N 10/17 136/224 |
| 2008/0259566 A1 | 10/2008 | Fried | |
| 2009/0084112 A1 | 4/2009 | Ham | |
| 2009/0109620 A1 | 4/2009 | Wang et al. | |
| 2009/0237619 A1 | 9/2009 | Yanagisawa et al. | |
| 2009/0249796 A1 | 10/2009 | Ullman | |
| 2010/0079952 A1 | 4/2010 | Liang et al. | |
| 2010/0185332 A1 | 7/2010 | Schmidt et al. | |
| 2010/0281884 A1* | 11/2010 | Rawski | F25B 21/04 62/3.6 |
| 2011/0107772 A1 | 5/2011 | Goenka | |
| 2011/0197598 A1 | 8/2011 | Cheng et al. | |
| 2011/0277967 A1 | 11/2011 | Fried et al. | |
| 2011/0303394 A1 | 12/2011 | Branton | |
| 2012/0024501 A1 | 2/2012 | Campbell et al. | |
| 2012/0038175 A1 | 2/2012 | Tang et al. | |
| 2012/0047911 A1 | 3/2012 | Bhavsar et al. | |
| 2012/0279233 A1 | 11/2012 | Chainer et al. | |
| 2012/0304667 A1 | 12/2012 | Shin et al. | |
| 2012/0312030 A1 | 12/2012 | Lu | |
| 2013/0199208 A1 | 8/2013 | Shi | |
| 2014/0071626 A1 | 3/2014 | Campbell et al. | |
| 2014/0260330 A1 | 9/2014 | Karlstedt | |
| 2014/0300871 A1 | 10/2014 | Yanagisawa et al. | |
| 2014/0318152 A1 | 10/2014 | Ghoshal et al. | |
| 2015/0059360 A1 | 3/2015 | Lin et al. | |
| 2015/0075184 A1 | 3/2015 | Edwards et al. | |
| 2015/0109728 A1 | 4/2015 | Campbell et al. | |
| 2015/0116943 A1 | 4/2015 | Olsson et al. | |
| 2015/0233647 A1 | 8/2015 | Quisenberry et al. | |
| 2016/0161998 A1 | 6/2016 | Kinstle, III | |
| 2016/0302326 A1 | 10/2016 | Chen et al. | |
| 2017/0138663 A1 | 5/2017 | Wells | |
| 2017/0191709 A1 | 7/2017 | Chen et al. | |
| 2017/0242463 A1 | 8/2017 | Matteson et al. | |
| 2017/0315595 A1 | 11/2017 | Kulkarni et al. | |
| 2017/0343254 A1 | 11/2017 | Ludwig | |
| 2018/0004259 A1 | 1/2018 | Kulkarni et al. | |
| 2018/0094838 A1 | 4/2018 | Chiki et al. | |
| 2019/0313553 A1 | 10/2019 | Robillon et al. | |
| 2019/0331425 A1 | 10/2019 | Hatasako et al. | |
| 2019/0377391 A1 | 12/2019 | Chen | |
| 2022/0214730 A1* | 7/2022 | Navarro Alvarez | H05K 7/20281 |

OTHER PUBLICATIONS

Office Action mailed Apr. 17, 2017 for U.S. Appl. No. 15/140,014, 21 pages.
Final Office Action mailed Nov. 2, 2017 for U.S. Appl. No. 15/140,014, 16 pages.
Office Action mailed May 10, 2018 for U.S. Appl. No. 15/199,003, 29 pages.
Final Office Action mailed Jan. 30, 2019 for U.S. Appl. No. 15/199,003, 29 pages.
Office Action mailed Oct. 1, 2019 for U.S. Appl. No. 15/199,003, 23 pages.
Final Office Action mailed Apr. 16, 2020 for U.S. Appl. No. 15/199,003, 32 pages.
Office Action mailed Dec. 11, 2020 for U.S. Appl. No. 15/199,003, 36 pages.

* cited by examiner

US 12,093,092 B2

HEAT TRANSFER APPARATUS FOR A COMPUTER ENVIRONMENT

RELATED APPLICATION

The present application is a continuation of U.S. patent application Ser. No. 15/199,003, filed Jun. 30, 2016, entitled "HEAT TRANSFER APPARATUS FOR A COMPUTER ENVIRONMENT". The Specification of the Ser. No. 15/199,003 Application is hereby incorporated by reference.

TECHNICAL FIELD

The present disclosure relates to the field of computer environments. More particularly, the present disclosure relates to coolant system design for computer environments.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advancements in computer and electrical technology have introduced issues with cooling of heat-producing equipment. For example, as the size of computer processor dies shrinks while maintaining or even increasing the number of cores within each computer processor, increase of heat dissipation for computer processors is desired for proper operation. Today, a computer processor may produce upwards of 200 watts of heat. Additionally, advancements in memory technologies have led to memory devices integrated within the computer processors increasing thermal design power from eight watts to greater than 15 watts of heat dissipation. Legacy cooling systems struggle and/or fail to dissipate the increased amount of heat leading to component failures and computer and/or electrical environments being designed for reduced performance to protect against permanent damage due to excess heat.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
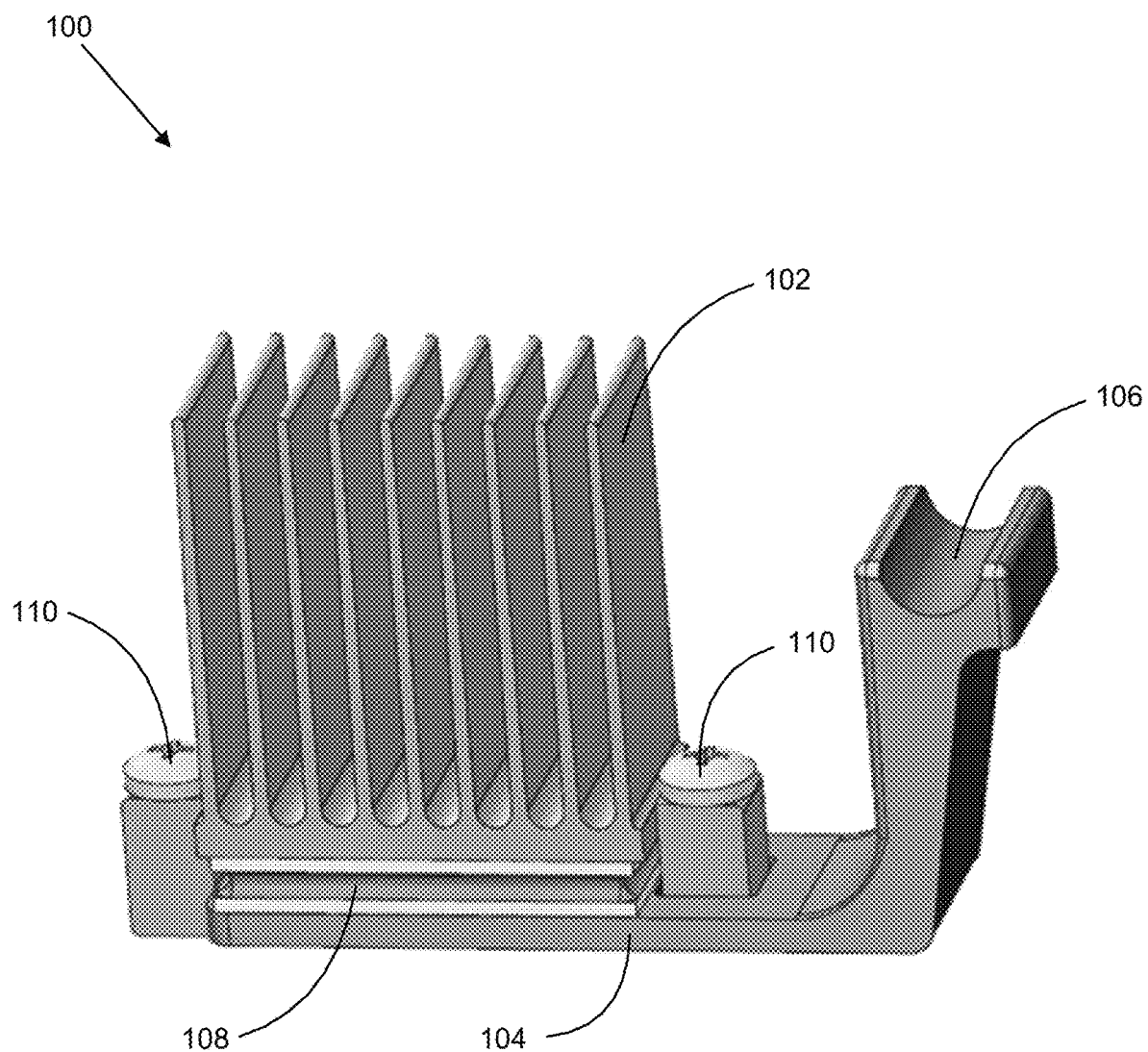
FIG. 1 illustrates an example heat transfer apparatus of the present disclosure, according to various embodiments.

Apparatuses, methods and storage medium associated with coolant systems for computer and electrical environments are disclosed herein. In embodiments, an apparatus for selectively transferring of heat within a computer environment may include a cold plate thermally coupled to a liquid line of a liquid coolant system of the computer environment, the cold plate to transfer heat to the liquid line and a thermally-conductive body to cool a component of the computer environment. The apparatus may further include a thermoelectric cooler (TEC) thermally coupled with the cold plate on a first side of the TEC and thermally coupled with the thermally-conductive body on a second side of the TEC, the TEC to increase an amount of heat transfer from the second side of the TEC to the first side of the TEC in response to energy provided to the TEC.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates an example heat transfer apparatus 100 of the present disclosure, according to various embodiments. The heat transfer apparatus 100 may be included in, or mounted within, a computer environment, such as a computer device, a server chassis, a switch, a router, a gateway, and so forth. In some embodiments, the heat transfer apparatus 100 may be included in, or mounted within, an electrical environment, such as transformers, transmission systems, power systems, other high power systems, or some combination thereof.

The heat transfer apparatus 100 may be utilized to cool air within the computer environment and/or the electrical environment (hereinafter referred to as 'the environment'). Utilization of the heat transfer apparatus 100 to cool air within the environment may provide many advantages. Legacy air cooling systems depend on external air directed into the environment to cool the components, leading to a large quantity of air (often a room or an entire building) being cooled to maintain the desired temperature of components within the environment. By allowing for cooling of air within the environment, the heat transfer apparatus 100 may reduce the quantity of air to be cooled, leading to reduced power consumption for maintaining the desired temperature of components within the environment. Additionally, the heat transfer apparatus 100 may be placed at locations within the environment to cool air directed to contact a certain component or components, which may allow for specific control of the air temperature in contact with the component or components to be cooled.

The heat transfer apparatus 100 may have an additional advantage of providing a greater amount of heat dissipation over legacy heat sinks and heat spreaders. Legacy heat sinks and heat spreaders are limited by an amount heat transfer the heat sinks and heat spreaders can provide and a temperature of the material that the heat sinks and heat spreaders are thermally coupled to, the temperature of the material to be maintained at a cooler temperature than the heat sinks and heat spreaders to allow for heat transfer from the heat sinks and heat spreaders. As will be described in more details below, the heat transfer apparatus 100 may provide a variable amount of heat transfer and a greater amount of heat transfer than legacy heat sinks and heat spreaders. Additionally, the cooling effect of the heat transfer apparatus 100 may be less dependent on the temperature of the material that the heat transfer apparatus 100 is thermally coupled to, as the heat transfer apparatus 100 may continue to move heat away from the component to be cooled without regard to the temperature of the material.

Figure 8:
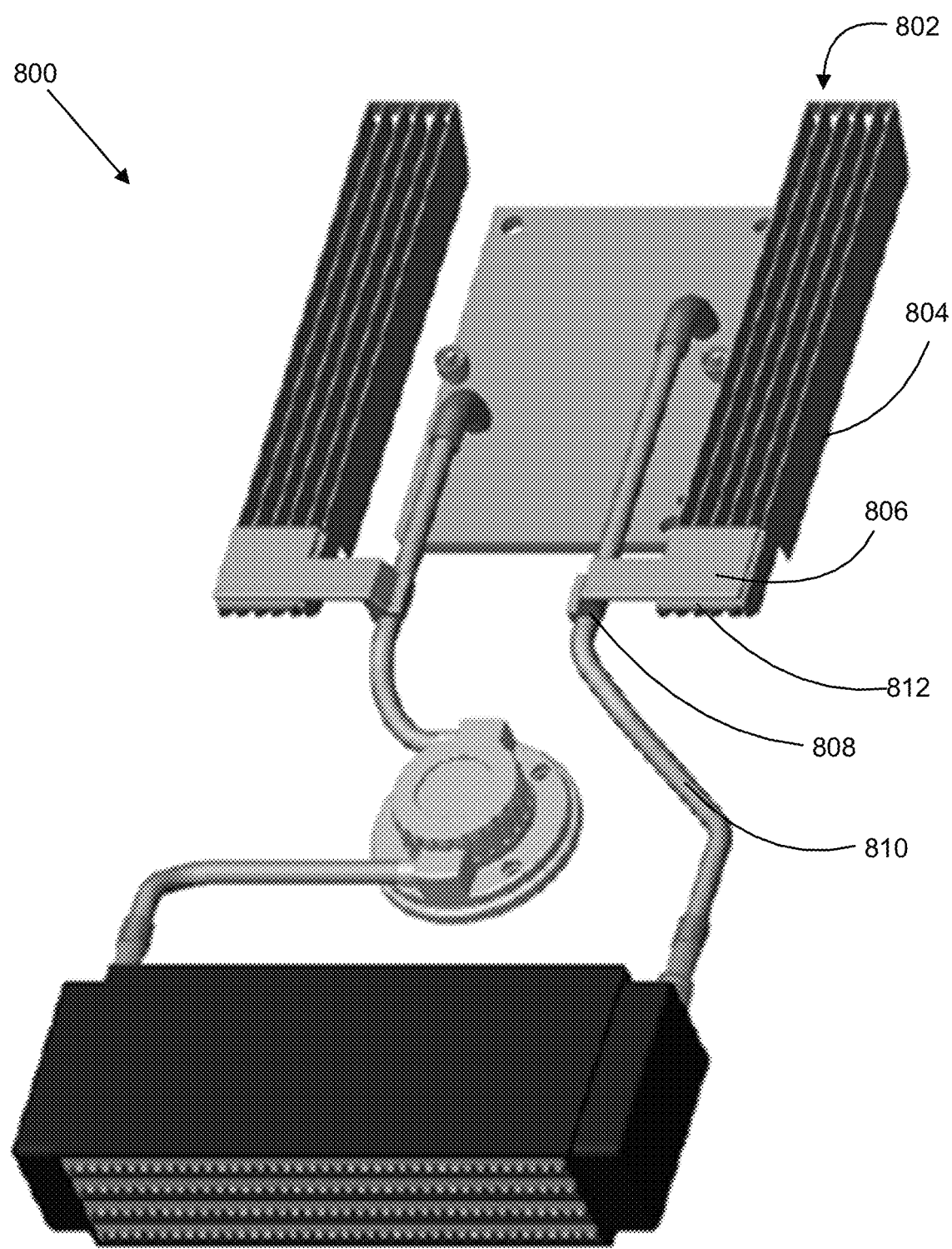
FIG. 8 illustrates an example liquid coolant system that implements an example heat transfer apparatus, according to various embodiments.

The heat transfer apparatus 100 may have another additional advantage of increasing a heat capture ratio (HCR) of a liquid coolant system of an environment that implements the heat transfer apparatus 100. The heat transfer apparatus 100 may facilitate the transfer of heat from air and/or components within the environment to liquid lines of the liquid coolant system, capturing the heat within the liquid of the liquid coolant system. This may result in an increase HCR over legacy liquid coolant systems that may lack implementations for transferring heat from the air and/or components within the environment to the liquid of the liquid coolant system. In some embodiments, the HCR may be increased to 100% by recirculating internal air through the environment. The increased HCR may allow for fewer heat conduction blocks (such as cold plates) paired with components within the environment, which may reduce design time and cost of the liquid coolant systems while providing adaptability of the liquid coolant systems for multiple different environments. These are just a few of the advantages provided by the heat transfer apparatus 100, and it is to be understood that the heat transfer apparatus 100 is not limited to these advantages. Additionally, some or all of these advantages may be provided by other heat transfer apparatus embodiments described throughout this disclosure, such as heat transfer apparatus 500 (FIG. 5) and/or heat transfer apparatus 802 (FIG. 8).

As illustrated, the heat transfer apparatus 100, in embodiments, may include a thermally-conductive body 102. The thermally-conductive body 102 may contact air within the environment and may provide heat transfer between the thermally-conductive body 102 and the air in contact with, or in proximity to, the thermally-conductive body 102. When at a cooler temperature than the air in contact with, or in proximity to, the thermally-conductive body 102, the thermally-conductive body 102 may provide a cooling effect to the air. The thermally-conductive body 102 may be positioned within an environment in a location that the air cooled by the thermally-conductive body 102 contacts a component of the environment. Accordingly, the thermally-conductive body 102 may indirectly cool the component of the environment.

The thermally-conductive body 102 may be a heat sink. The heat sink may include two or more fins through which air may pass between. The air that passes between the two or more fins of the heat sink may be cooled. The heat sink may be situated such that a direction of airflow through the environment is in line with a direction of the fins of the heat sink, such that the air may pass between the fins with minimum or no alteration to the direction of airflow.

The thermally-conductive body 102 may be constructed of a material or materials that present a relatively high amount of thermal conductivity. In some embodiments, the thermally-conductive body 102 may be copper, aluminum, copper alloy, aluminum alloy, or some combination thereof. The thermally-conductive body 102 may be any material commonly used for heat sinks by one having ordinary skill in the art.

The heat transfer apparatus 100 may include a cold plate 104. The cold plate 104 may be constructed a material or materials that present a relatively high amount of thermal conductivity. The cold plate 104 may be copper, aluminum, copper alloy, aluminum alloy, or some combination thereof. The cold plate 104 may be any material commonly used for cold plates by one having ordinary skill in the art.

The cold plate 104 may include a coupling portion 106. The coupling portion 106 may thermally couple the cold plate 104 to a coolant system of the environment. The coolant system may include a liquid coolant system of the environment, the liquid coolant system may have one or more liquid lines for carrying liquid through the environment. The liquid lines may be utilized to cool one or more components within the environment. The coupling portion 106 may thermally couple the cold plate 104 to one of the liquid lines of the liquid coolant system. The coupling portion 106 may be shaped to contact the liquid line around a portion or a whole of a circumference of the liquid line. For example, the coupling portion 106 may be curved to mate with an outside surface of the liquid line. The coupling portion 106 may be utilized for thermal transfer of heat from the cold plate 104 to the liquid line.

The heat transfer apparatus 100 may include a thermoelectric cooler (TEC) 108. The TEC 108 may include two opposing sides. The two opposing sides may each include a substrate, such as a ceramic substrate. In some embodiments, the substrates may be constructed of alumina beryllium oxide or aluminum nitride.

The TEC 108 may include two dissimilar types of conductors located between the two opposing sides of the TEC 108. One type of the two dissimilar types of conductors may be P-type semiconductor elements and the other type of the two dissimilar types of conductors may be N-type semiconductor elements. In some embodiments, the P-type and the N-type semiconductor elements may be constructed of bismuth telluride. As energy (such as in the form of electrical voltage, current, and/or wattage) is applied to the two dissimilar types of conductors, heat transfer from one side of the TEC 108 may be increased to the other side of the TEC 108 based on the Peltier effect. Accordingly, one side of the TEC 108 may be colder than the other side of the TEC 108, resulting in a temperature differential between the sides of the TEC 108.

The TEC 108 may be thermally coupled to the thermally-conductive body 102 on one side of the TEC 108 and the cold plate 104 on another side of the TEC 108. The TEC 108 may be located between the thermally-conductive body 102 and the cold plate 104, with the thermally-conductive body 102 thermally coupled to one side of the TEC 108 and the cold plate 104 thermally coupled to an opposing side of the TEC 108. In some embodiments, thermal adhesive material and/or thermal transfer compounds (such as thermal grease) may be located intermediate the TEC 108 and the thermally-conductive body 102 and/or the cold plate 104 to facilitate heat transfer among the TEC 108, the thermally-conductive body 102, the cold plate 104, or some combination thereof.

The TEC 108 may be utilized to increase an amount of heat transfer from the thermally-conductive body 102 to the cold plate 104. The TEC 108 may increase the rate and/or amount of heat transfer from the thermally-conductive body 102 to the cold plate 104 in response to energy (such as in the form of electrical voltage, current, and/or wattage) being provided to the TEC 108. In response to the provision of energy, the TEC 108 may maintain, or attempt to maintain, a temperature differential between a first side of the TEC 108 and a second side of the TEC 108. Based on temperature differential, the first side of the TEC 108 (referred to as 'the cold side') may be maintained at a cooler temperature than the second side of the TEC 108 (referred to as 'the hot side').

The cold side of the TEC 108 may be thermally coupled to the thermally-conductive body 102, while the hot side of the TEC 108 may be thermally coupled to the cold plate 104. In response to the energy being provided to the TEC 108, the TEC 108 may transfer heat from the cold side of the TEC 108 to the hot side of the TEC 108 to produce the temperature differential. In order to maintain the temperature differential when the TEC 108 is coupled to the thermally-conductive body 102 and the cold plate 104, the TEC 108 may increase an amount heat transfer from the thermally-conductive body 102 to the cold plate 104.

The temperature differential between the cold side of the TEC 108 and the hot side of the TEC 108 may vary depending on the amount of energy provided to the TEC 108. As the amount of energy is increased, the amount of temperature differential between the cold side and the hot side may increase, and vice versa. Accordingly, the rate and/or amount of heat transfer from the thermally-conductive body 102 to the cold plate 104 may be dependent on the amount of energy provided to the TEC 108, the heat transfer increasing in response to an increase in the mount of energy provided, and vice versa. The rate and/or amount of heat transfer may be proportional to the amount of energy provided to the TEC 108.

In some embodiments, the thermally-conductive body 102 and/or the TEC 108 may be mounted to the cold plate 104 by one or more fasteners 110. The TEC 108 may be mounted between the thermally-conductive body 102 and the cold plate 104. The fasteners 110 may further mount the cold plate 104 to a surface of the environment. In some embodiment, the thermally-conductive body 102 and/or the TEC 108 may be mounted to the cold pate 104 by an adhesive, such as a thermal conductive tape.

Figure 2:
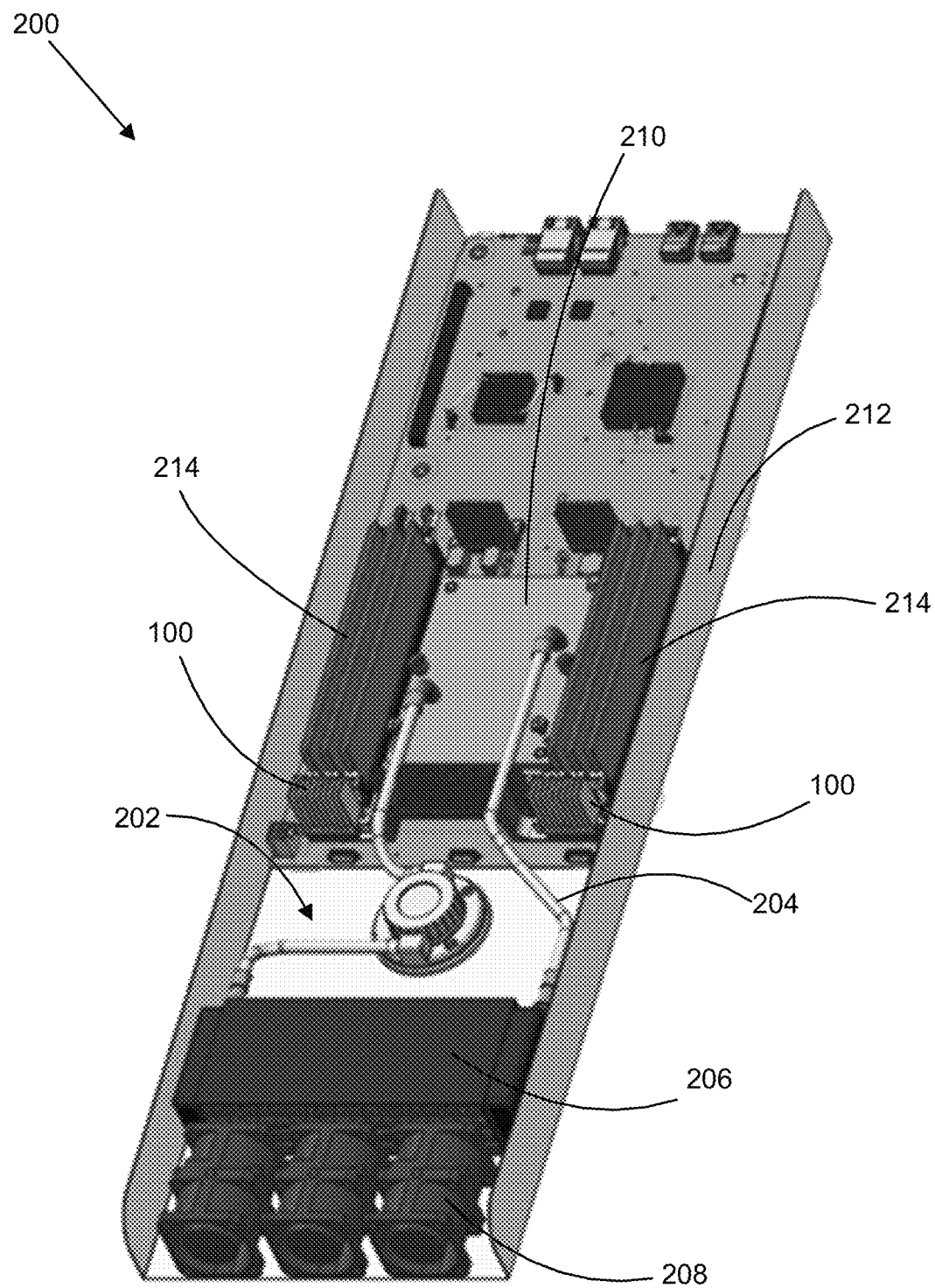
FIG. 2 illustrates an example computer environment that implements the example heat transfer apparatus of FIG. 1, according to various embodiments.

FIG. 2 illustrates an example computer environment 200 that implements the example heat transfer apparatus 100 of FIG. 1, according to various embodiments. The computer environment 200 may include one or more computer components, including central processing units (CPUs), memory, controllers, connectors, transistors, displays, communication chips, speakers, batteries, antennas, storage devices, cameras, or some combination thereof. The computer environment 200 may be a server chassis. In some embodiments, the computer environment 200 may be a computer device.

The computer environment 200 may include a liquid coolant system 202, which may include one or more liquid lines 204. The liquid coolant system 202 may include a heat exchanger 206 for cooling liquid (such as oil and/or water) and/or vapor that passes through the liquid lines 204. The heat exchanger 206 may be coupled to the liquid lines 204, such that the liquid that passes through the liquid lines 204 may pass into the heat exchanger 206 as the liquid is moved within the liquid coolant system 202. The heat exchanger 206 may be located in front of fans 208 of the computer environment 200, the fans 208 may direct air from the outside the computer environment 200 into the computer environment 200 and the heat exchanger 206. As the air passes through the heat exchanger 206 the air may cool the liquid of the liquid coolant system 202 that passes into the heat exchanger 206.

The liquid coolant system 202 may pump a liquid (such as oil and/or water) through the liquid lines 204. The liquid may receive heat in when passed through the liquid lines 204 and transfer the heat to the heat exchanger 206, where the liquid is cooled. The liquid may further pass into the coolant plates, such as coolant plate 210, for cooling of one or more components within the computer environment 200. In some embodiments, the coolant plate 210 may cool a CPU of the computer environment 200.

The liquid coolant system 202 may be a single-phase system or a two-phase system. In a single-phase system, the liquid within the liquid lines 204 remains as liquid independent of the heat transferred to the liquid. In the two-phase system, the liquid within the liquid lines 204 may transition to vapor when a temperature of the liquid exceeds a phase-transition temperature of the liquid. In response to the temperature of the vapor being equal or less than the phase-transition temperature of the liquid, the vapor may transition back into liquid form, which may often occur within the heat exchanger 206.

While the liquid coolant system 202 described remains internal to the computer environment 200, it is to be understood that other coolant systems may be utilized within the computer environment 200, including liquid coolant systems that may have portions of the liquid coolant system external to the computer environment 200. For example, a liquid coolant system with liquid lines that run to a heat exchanger located external to the computer environment 200 may be utilized, where the heat exchanger may provide cooling through fans or some other coolant system located external to the computer environment 200.

One or more heat transfer apparatuses 100 may be mounted within the computer environment 200. The heat transfer apparatuses 100 may be mounted to a frame 212 of the computer environment 200. The cold plates 104 (FIG. 1) of the heat transfer apparatuses 100 may contact the frame 212. In some embodiments, the cold plate 104 may be thermally coupled to the frame 212 and may transfer some portion of the heat from the thermally-conductive body 102 (FIG. 1) to the frame 212.

The heat transfer apparatuses 100 may be thermally coupled to one or more of the liquid lines 204 of the liquid coolant system 202. The heat transfer apparatuses 100 may be thermally coupled to the liquid lines 204 by the coupling portion 106 (FIG. 1) of the heat transfer apparatus 100. The heat transfer apparatus 100 may transfer heat from the thermally-conductive body 102 to the liquid lines 204 through the coupling portion 106. The heat transferred to the liquid lines 204 may further be transferred to the liquid within the liquid lines 204, which may carry the heat through the liquid lines 204 to the heat exchanger 206 for cooling of the liquid. The heat transfer by the heat transfer apparatuses 100 to the liquid within the liquid lines 204 may result in an increased liquid HCR from the components as compared to legacy liquid coolant systems.

The heat transfer apparatuses 100 may be mounted in locations of the computer environment 200 based on components to be cooled by the heat transfer apparatuses 100. The heat transfer apparatuses 100 may be located between the fans 208 and the components to be cooled. The fans 208 may direct air across the heat transfer apparatus 100 to the components to be cooled and the heat transfer apparatus 100 may cool the air prior to the air contacting the components to be cooled.

The components to be cooled may include memory devices 214 of the computer environment 200. The memory devices 214 may include dual-inline memory modules. The heat transfer apparatuses 100 may be located between the fans 208 and the memory devices 214, such that the fans 208 may direct air across the heat transfer apparatuses 100 prior to the air contacting the memory devices 214.

The heat transfer apparatuses 100 may be activated through provision of energy to the TEC 108 (FIG. 1) of the heat transfer apparatuses 100. The heat transfer apparatuses 100 may be activated based on a temperature of the components to be cooled by the heat transfer apparatuses 100 exceeding a threshold temperature. The temperature of the components may include a memory junction temperature of the components, a chipset junction temperature of the components, or some combination thereof. For example, the heat transfer apparatuses 100 may be activated in response to a temperature of the components exceeding a maximum operational temperature associated with the components. In some embodiments, the heat transfer apparatuses 100 may be activated in response to the temperature of the components exceeding a certain percentage (such as 70%) of the maximum operational temperature.

In some embodiments, the heat transfer apparatuses 100 may be activated based on a level of operation of the component to be cooled. For example, the heat transfer apparatuses 100 may be activated in response to the level of operation of the component exceeding a certain percentage (such as 70%) of the maximum level of operation of the component. In some embodiments, the heat transfer apparatuses 100 may be activated based on both the temperature of the components and the level of operation, the heat transfer apparatus 100 being activated in response to whichever of the temperature or level of operation that exceeds its corresponding threshold value first.

In some embodiments, the amount of energy provided to the TEC 108 may be based on an amount the temperature of the component exceeds the threshold temperature and/or an amount the level of operation of the component exceeds the threshold level of operation. The amount of energy provided to the TEC 108 may increase as the amount of the temperature of the component exceeds the threshold temperature increases and/or the amount of the level of operation of the component exceeds the threshold level of operation.

In some embodiments, the amount of energy provided to the TEC 108 may further be varied based on other components in the computer environment 200, other than the components to be cooled by the heat transfer apparatuses 100. For example, where the liquid coolant system 202 includes a coolant plate 210 to cool a CPU of the computer environment 200, the amount of energy provided to the TEC 108 may further be based on the temperature and/or the operation level of the CPU. As the heat of the CPU increases, the amount of energy provided to the TEC 108 may be decreased to reduce the amount of heat transferred to the liquid lines 204 by the heat transfer apparatus 100, therefore reducing the amount of increase in temperature of the liquid within the liquid lines 204 that pass within, and/or are coupled to, the coolant plate 210.

In some embodiments, the heat transfer apparatuses 100 may be activated whenever the computer environment 200 is in an on state. The amount of energy provided to the TEC 108 may vary based on the temperature and/or level of operation of the components to be cooled, the temperature and/or level of operation of other components within the computer environment 200, or some combination thereof.

In some embodiments where the computer environment 200 includes more than one heat transfer apparatus 100, different heat transfer apparatuses 100 may have different threshold values (such as threshold temperatures or threshold levels of operation) for activation of the heat transfer apparatuses 100. The threshold values for each heat transfer apparatus 100 may correspond to the component to be cooled by the heat transfer apparatus 100. As the type and/or operational specifics of the components to be cooled vary among the heat transfer apparatuses 100, the threshold values may also vary among the heat transfer apparatuses 100 correspondingly. Further, the rate of change in the amount of energy provided to the TEC 108, based on the amount the temperature and/or level of operation of the components to be cooled exceed the threshold value/s, may be varied based on the type and/or operational specifics of the components.

In some embodiments where the computer environment 200 includes more than one heat transfer apparatus 100, different heat transfer apparatuses 100 may have different threshold values for activation based on locations of the different heat transfer apparatuses 100 within the computer environment 200. For example, heat transfer devices 100 closer to the fans 208 may be set with lower activation threshold values than heat transfer devices 100 farther away from the fans 208. Further, the rate of change in the amount of energy provided to the TEC 108, based on the amount the temperature and/or level of operation of the components to be cooled exceed the threshold value/s, may be varied based on the location of the heat transfer apparatuses 100.

In some embodiments, operation of the liquid coolant system 202 may further be based on one or more of the components within the computer environment 200, including the components to be cooled by the heat transfer apparatuses 100. The liquid coolant system 202 may not circulate the liquid through the liquid lines when measured values of the components are below or equal to a threshold value/s (such as temperature or level of operation of the components). When the measured values of the components exceed the threshold value/s, the liquid coolant system 202 may circulate the liquid through the liquid lines 204.

Figure 3:
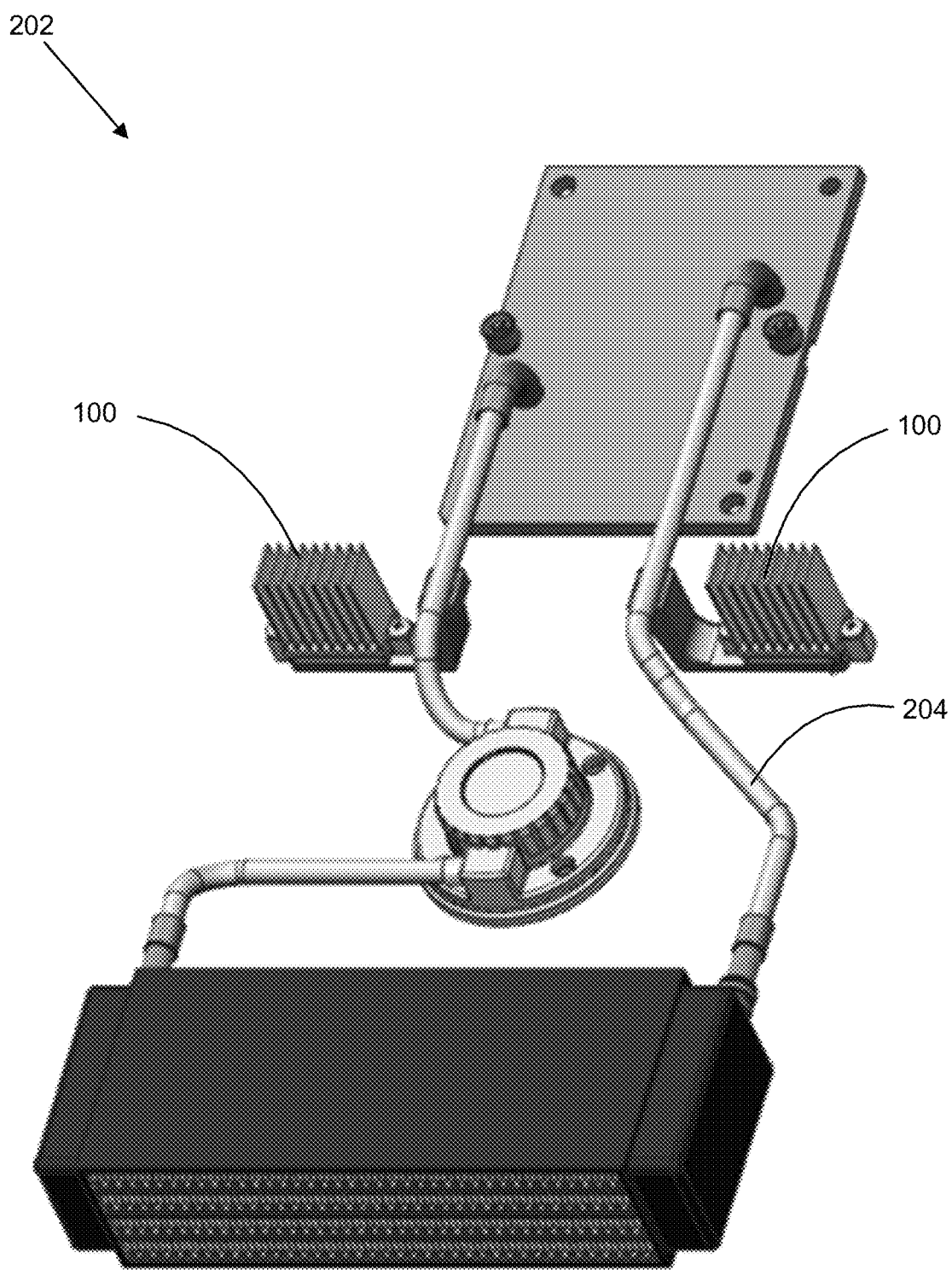
FIG. 3 illustrates the example liquid coolant system of the example computer environment of FIG. 2, according to various embodiments.

FIG. 3 illustrates the example liquid coolant system 202 of the example computer environment 200 of FIG. 2, according to various embodiments. The heat transfer apparatuses 100 may be mounted into a computer environment, such as the computer environment 200 (FIG. 2), and coupled to the liquid coolant system 202 after the liquid coolant system 202 has been installed in the computer environment.

In other embodiments, the liquid coolant system 202 with the heat transfer apparatuses 100 may be an integrated system to be mounted within the computer environment 200. The heat transfer apparatuses 100 may be affixed to the liquid lines 204 of the liquid coolant system 202. The liquid coolant system 202 with the heat transfer apparatuses 100 may installed into the computer environment as an aftermarket accessory. The liquid coolant system 202 with the heat transfer apparatuses 100 may be designed such that the liquid coolant system 202 with the heat transfer apparatuses 100 may be installed into the computer environment without conflict with components of the computer environment.

The liquid coolant system 202 with the heat transfer apparatuses 100 may be communicatively coupled with the circuitry of the computer environment, allowing the computer environment to control operation of the liquid coolant system 202 and/or the heat transfer apparatuses. The circuitry of the computer environment may utilize sensors of the computer environment for determination of when to activate the heat transfer apparatuses 100 and/or have the liquid coolant system 202 circulate the liquid.

In other embodiments, the liquid coolant system 202 and/or the heat transfer apparatuses 100 may rely on the power supply or be independent from the circuitry of the computer environment. The liquid coolant system 202 and/or the heat transfer apparatuses 100 may include control circuitry for determination of when to activate the heat transfer apparatuses 100 and/or have the liquid coolant system 202 circulate the liquid.

Figure 4:
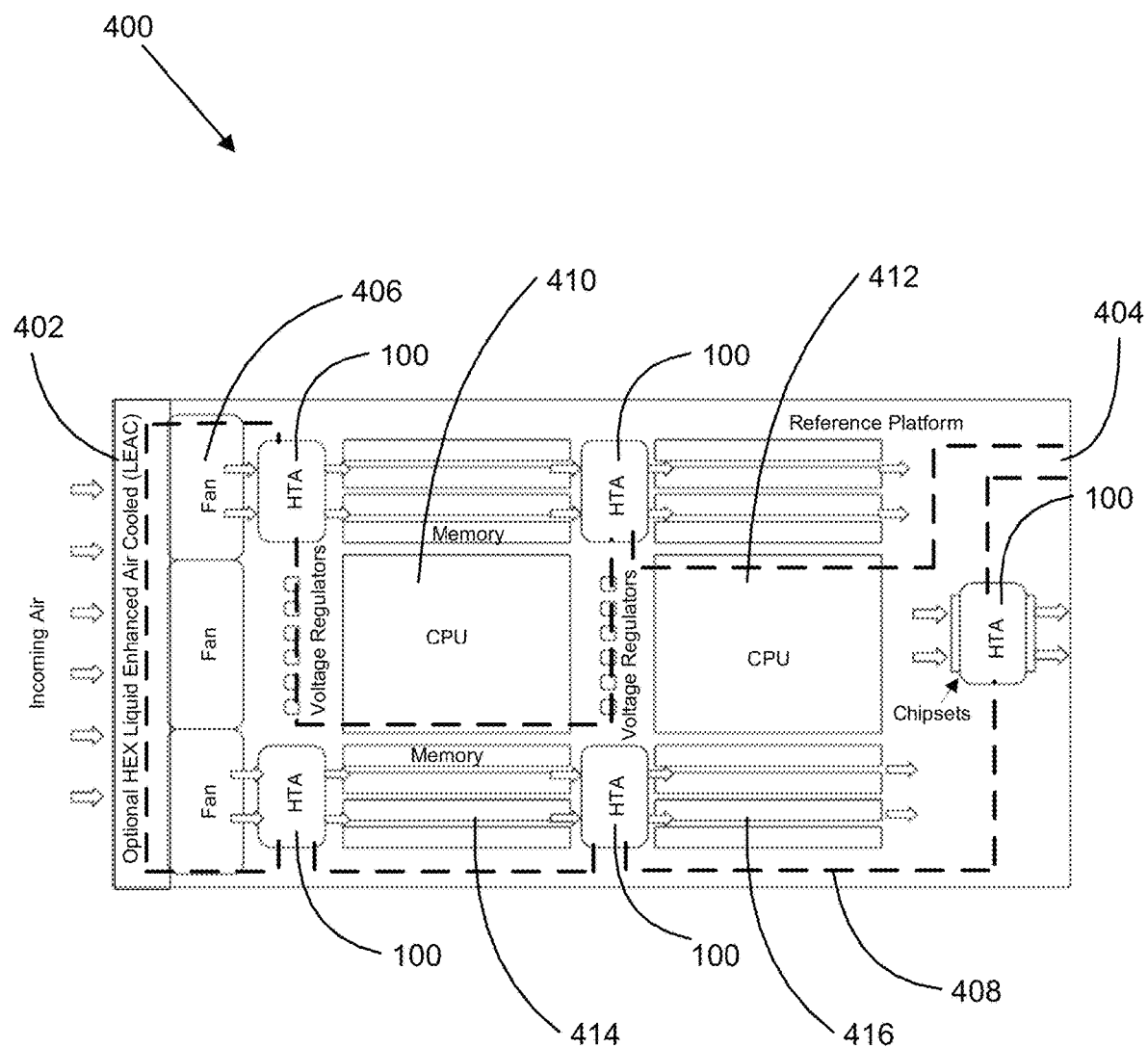
FIG. 4 illustrates an example computer environment layout that implements the example heat transfer apparatus of FIG. 1, according to various embodiments.

FIG. 4 illustrates an example computer environment layout 400 that implements the example heat transfer apparatus 100 of FIG. 1, according to various embodiments. The computer environment layout 400 may include one or more components, including CPUs, memory, controllers, connectors, transistors, displays, communication chips, speakers, batteries, antennas, storage devices, cameras, or some combination thereof. The computer environment layout 400 may be a layout for a server chassis.

The computer environment layout 400 may be at least partially open to the outside of the computer environment on a first side 402 to allow inflow of air from outside the computer environment. One or more of the other sides of the computer environment may be at least partially open to the outside of the computer environment. In some embodiments, a second side 404 of the computer environment, opposite to the first side 402, may be at least partially open to the outside of the computer environment to allow outflow of air from inside the computer environment.

The computer environment layout 400 may include one or more fans 406 to direct air into the computer environment. The fans 406 may be located towards the first side 402 of the computer environment and may draw air in from the first side 402 of the computer environment and direct the air across the components of the computer environment. The air directed by the fans 406 may exit the computer environment by the second side 404.

The computer environment layout 400 may include one or more liquid lines 408 of a liquid coolant system, such as the liquid coolant system 202 (FIG. 2). The liquid lines 408 may be routed past one or more of the components within the computer environment. The liquid lines 408 may be routed to a heat exchanger, such as the heat exchanger 206 (FIG. 2), near the fans 406, where the liquid in the liquid lines 408 may be cooled. In some embodiments, the heat exchanger may be located between the first side 402 of the computer environment and the fans 406.

The liquid lines 408 may further be routed to one or more of the heat transfer apparatuses 100. The liquid lines 408 may be thermally coupled to the heat transfer apparatuses 100 and may carry heat from the heat transfer apparatuses 100 to the heat exchanger in the liquid circulated within the liquid lines 408.

The computer environment layout 400 may include one or more CPUs, such as first CPU 410 and second CPU 412. The first CPU 410 and/or the second CPU 412 may be cooled by air directed into the computer environment by the fans 406. In some embodiments, the first CPU 410 and/or the second CPU 412 may be cooled by a coolant plate, such as coolant plate 210 (FIG. 2). The coolant plates may be thermally coupled to the liquid lines 408. The liquid in the liquid lines 408 may receive heat transferred from the coolant plates to the liquid lines 408 and move the heat away from the first CPU 410 and/or the second CPU 412.

The computer environment layout 400 may include one or more memory devices, such as first set of memory devices 414 and second set of memory devices 414 (collectively referred to as 'the memory sets'). The memory sets may each include one or more duel-inline memory modules. Each of the memory sets may be located next to a CPU, such as the first CPU 410 for the first set of memory devices 414 and the second CPU 412 for the second set of memory devices 416.

The computer environment layout 400 may include one or more heat transfer apparatuses 100 to cool the memory sets. One or more of the heat transfer apparatuses 100 may be located between the fans 406 and the first set of memory devices 414. The fans 406 may direct air across the heat transfer apparatuses 100 to cool the first set of memory devices 414, wherein the heat transfer apparatuses 100 may cool the air as it passes the heat transfer apparatuses 100 and prior to contacting the first set of memory devices 414.

The computer environment layout 400 may include one or more heat transfer apparatuses 100 located between the first set of memory devices 414 and the second set of memory devices 416. The heat transfer apparatuses 100 may cool air directed by the fans 406 toward the second set of memory devices 416. The air may cool the first set of memory devices 414 prior to reaching the second set of memory devices 416. The heat transfer apparatuses located between the first set of memory devices 414 and the second set of memory devices 416 may cool the air prior to the air contacting the second set of memory devices 416.

The computer environment layout 400 may include one or more heat transfer apparatuses 100 located toward the second side 404 of the computer environment. The heat transfer apparatuses 100 may be located between the second side 404 of the computer environment and the components of the computer environment. The heat transfer apparatuses 100 located toward the second side 404 may cool the air that exits the computer environment.

Accordingly, the heat transfer apparatuses 100 located toward the second side 404 may be helpful in meeting standards that dictate a maximum temperature of exhaust air exiting a computer environment. The heat transfer apparatuses 100 located toward the second side 404 may cool air prior to the air exiting the computer environment, allowing for control of the temperature of air exiting the computer environment. Legacy cooling systems for computer environments often do not allow for cooling of air prior to exhaust from the computer environment and, accordingly, may be limited to power systems of reduced power due to standards dictating exhaust air temperature. Embodiments disclosed herein may provide improvements in the area of exhaust air temperature control over legacy cooling systems and may not be as limited by the standards dictating exhaust air temperature.

It is to be understood that the computer environment layout 400 is one example computer environment layout with the heat transfer apparatuses 100. There may be multiple different computer environment layouts with the heat transfer apparatuses 100. The computer environment layouts may be designed based on goals of operation of the computer environment layout.

Figure 5:
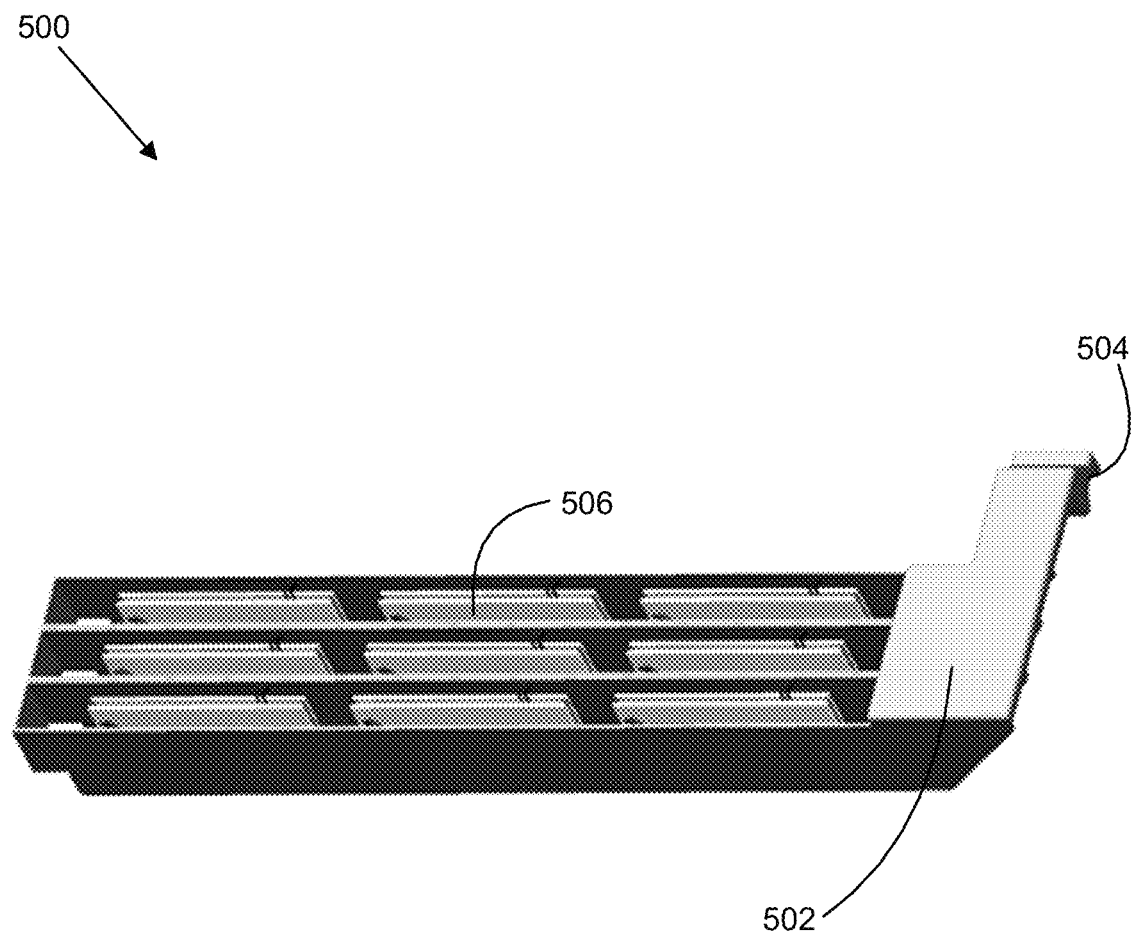
FIG. 5 illustrates another example heat transfer apparatus of the present disclosure, according to various embodiments.

FIG. 5 illustrates another example heat transfer apparatus 500 of the present disclosure, according to various embodiments. The heat transfer apparatus 500 may be included in, or mounted within, a computer environment, such as a computer device, a server chassis, or some combination thereof. In some embodiments, the heat transfer apparatus 500 may be included in, or mounted within, an electrical environment, such as transformers, transmission systems, power systems, other high power systems, or some combination thereof.

The heat transfer apparatus 500 may cool one or more components within the computer environment and/or the electrical environment (hereinafter 'the environment'). The heat transfer apparatus 500 may be thermally coupled to the components within the environment and may contact the components. In some embodiments, the components may be one or more dual-inline memory modules.

The heat transfer apparatus 500 may include a heat spreader 502. The heat spreader 502 may be constructed of a material or materials that present a relatively high amount of thermal conductivity. The heat spreader 502 may be copper, aluminum, copper alloy, aluminum alloy, or some combination thereof. The heat spreader 502 may be any material commonly used for heat spreaders by one having ordinary skill in the art.

The heat spreader 502 may include a coupling portion 504. The coupling portion 504 may thermally couple the heat spreader 502 to a coolant system of the environment. The coolant system may include a liquid coolant system of the environment, wherein the liquid coolant system may include one or more liquid lines for circulating liquid within the environment. The liquid lines may be utilized to cool one or more components within the environment. The coupling portion 504 may thermally couple the heat spreader 502 to one of the liquid lines of the liquid coolant system. The coupling portion 504 may be shaped to contact the liquid line around a portion or a whole of a circumference of the liquid line. For example, the coupling portion 504 may be curved to mate with an outside surface of the liquid line. The coupling portion 504 may be utilized for thermal transfer of heat from the heat spreader 502 to the liquid line.

The heat transfer apparatus 500 may include one or more TECs 506. The TECs 506 may include one or more of the features of the TEC 108 (FIG. 1), including one or more of the features related to the production of the temperature differential between the cold side and the hot side of the TEC 108. The TECs 506 may be thermally coupled on one side to the heat spreader 502 and thermally coupled on a second side to components to be cooled by the heat transfer apparatus 500.

The TECs 506 may increase a rate and/or amount of transfer of heat from the components to be cooled to the heat spreader 502 in response to energy being provided to the TECs 506. The energy provided to the TECs 506 may be provided and/or varied in accordance with the procedures described in relation to the TEC 108, including being provided and/or varied based on measured values of the components to be cooled being compared to a threshold value (such as a threshold temperature and/or threshold level of operation).

In some embodiments, a thermally-conductive compound may be located between each of the TECs 506 and the components to be cooled, and/or between each of the TECs 506 and the heat spreader 502. The thermally-conductive compound may facilitate the heat transfer between each of the TECs 506 and the components to be cooled, and/or between each of the TECs 506 and the heat spreader 502. The thermally-conductive compound may include heat-transfer adhesives, heat-transfer grease, or some combination thereof.

In some embodiments, a thermally-conductive body may be located between each of the TECs 506 and the components to be cooled by the heat transfer apparatus 500. The thermally-conductive body may transfer heat from the components to be cooled to the TECs 506. The thermally-conductive body may be constructed of a material or materials that present a relatively high amount of thermal conductivity. In some embodiments, the thermally-conductive body may be copper, aluminum, copper alloy, aluminum alloy, or some combination thereof.

Figure 6:
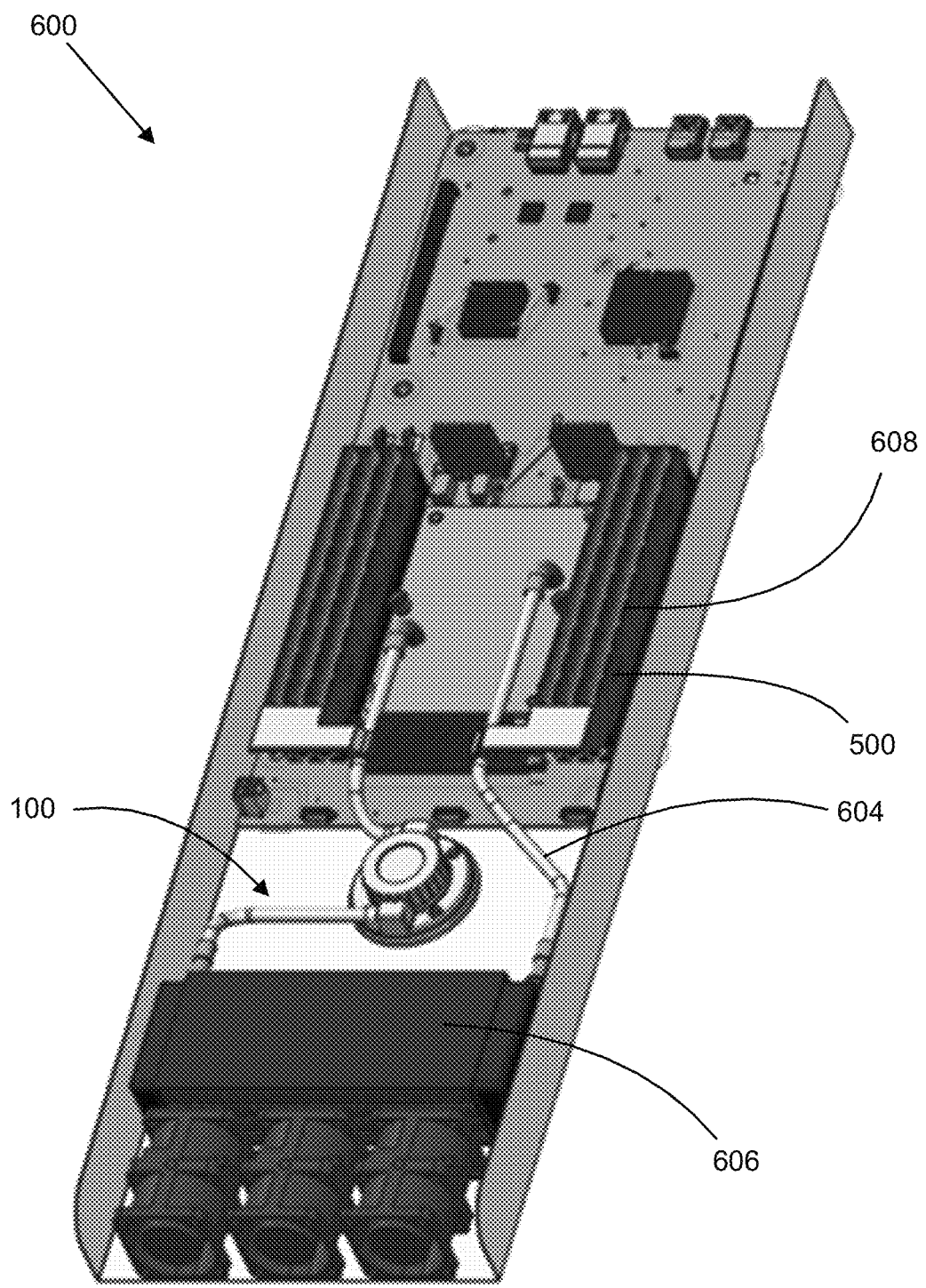
FIG. 6 illustrates an example computer environment that implements the example heat transfer apparatus of FIG. 5, according to various embodiments.

FIG. 6 illustrates an example computer environment 600 that implements the example heat transfer apparatus 500 of FIG. 5, according to various embodiments. The computer environment 600 may include one or more features of the computer environment 200, including the components of the computer environment 200.

The computer environment 600 may include a liquid coolant system 602. The liquid coolant system 602 may include one or more of the features of the liquid coolant system 202 (FIG. 2). The liquid coolant system 602 may include one or more liquid lines 604 routed within the computer environment 600. The liquid lines 604 may carry liquid (such as oil or water) within the liquid lines 604 to a heat exchanger 606 for cooling of the liquid. The heat exchanger 606 may include one or more of the features of the heat exchanger 206 (FIG. 2).

The computer environment 600 may include one or more of the heat transfer apparatuses 500. The heat transfer apparatuses 500 may be thermally coupled to one or more components to be cooled by the heat transfer apparatuses 500 and may be thermally coupled to one or more of the liquid lines 604. The heat transfer apparatuses 500 may be thermally coupled to the liquid lines 604 by the coupling portion 504 (FIG. 5) of the heat transfer apparatuses 500. The components to be cooled may include one or more memory devices 608. The memory devices 608 may include one or more dual-inline memory modules.

The TECs 506 (FIG. 5) of the heat transfer apparatuses 500 may contact the components to be cooled on the cold sides of the TECs 506. The cold sides of the TECs 506 may be flat and may be physically pressed up against the components to be cooled. In some embodiments, the cold sides of the TECs 506 may be shaped and/or formed to contact the component to be cooled on more than one side of the component. Heat transfer material, such as heat transfer epoxy and/or heat transfer grease, may be located between the cold sides of the TECs 506 and the components to be cooled to facilitate transfer of heat from the components to the cold sides of the TECs 506.

In some embodiments, there may be two TECs 506 per one component to be cooled. The two TECs 506 may be configured such that the cold side of each of the TECs 506 contact the component to be cooled on opposing sides. A hot side of each of the TECs 506, located opposite from the cold side of each of the TECs 506, may contact the heat spreader 502 and may be thermally coupled to the heat spreader 502 to transfer heat away from the component to be cooled.

In response to provision of energy to the TECs 506, the TECs 506 may increase a rate and/or amount of heat transfer from the components to be cooled to the heat spreader 502 (FIG. 5) of the TECs 506. The provision of energy to the TECs 506 and/or the amount of energy provided to the TECs 506 may be provided in accordance with one or more of the procedures for provision of energy to the TEC 108 and/or the amount of energy provided to the TEC 108 described in relation to computer environment 200 (FIG. 2).

The heat transfer apparatuses 500 may transfer heat from the components to be cooled to the liquid lines 604. The liquid coolant system 602 may circulate liquid within the liquid lines 604, wherein the heat transferred by the heat transfer apparatuses 500 to the liquid lines 604 may be transferred to the liquid, which may carry the heat away from the heat transfer apparatuses 500. Control of the circulation of the liquid and/or cooling of the liquid may be performed in accordance with the one or more of the procedures for control of circulation of the liquid and/or cooling of the liquid described in relation to the computer environment 200 (FIG. 2) and/or the liquid coolant system 212 (FIG. 3).

Figure 7:
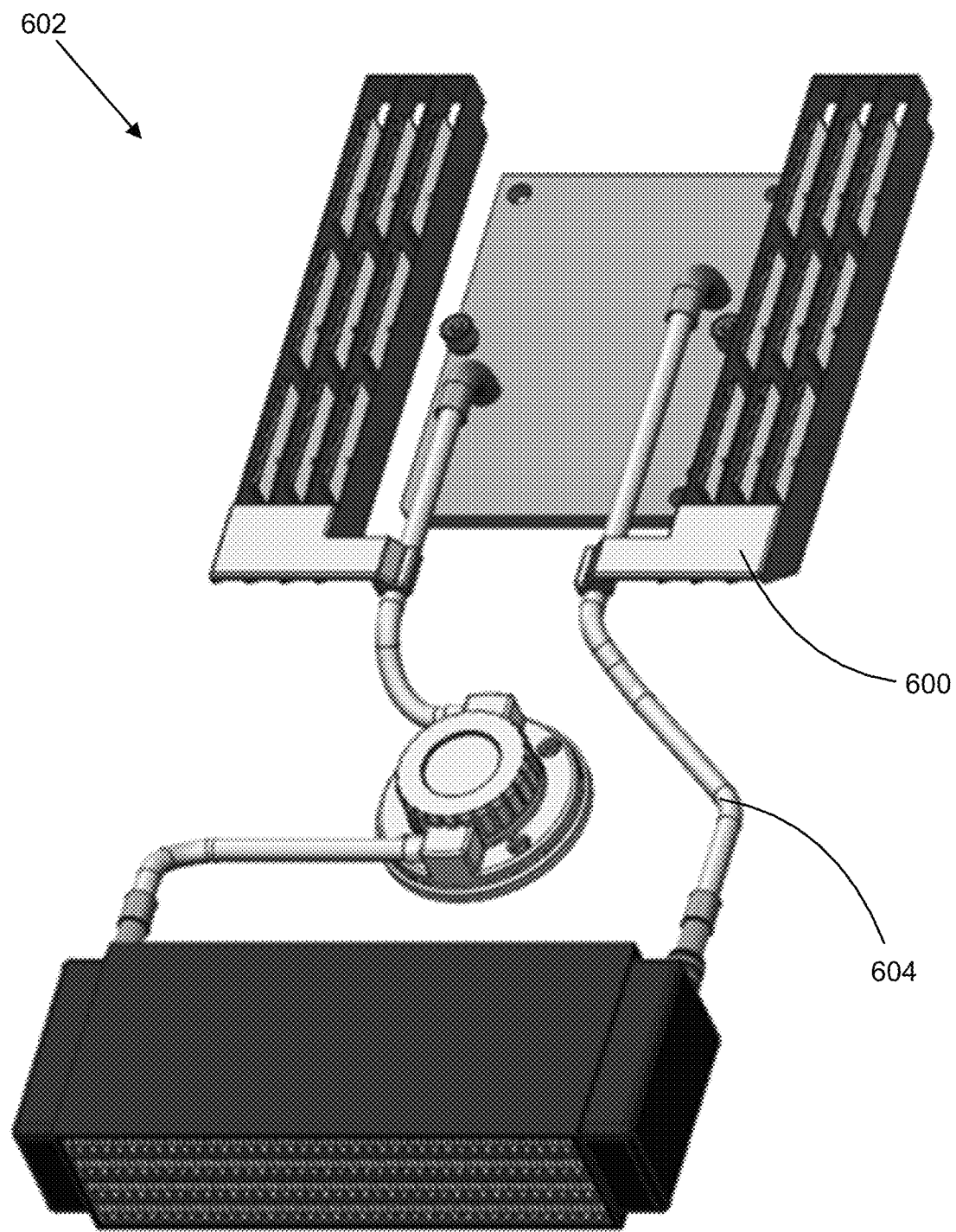
FIG. 7 illustrates the example liquid coolant system of the example computer environment of FIG. 6, according to various embodiments.

FIG. 7 illustrates the example liquid coolant system 602 of the example computer environment of FIG. 6, according to various embodiments. The heat transfer apparatuses 500 may be mounted into a computer environment, such as the computer environment 200 (FIG. 2) and/or the computer environment 600 (FIG. 6), and coupled to the liquid coolant system 602 after the liquid coolant system 602 has been installed in the computer environment.

In other embodiments, the liquid coolant system 602 with the heat transfer apparatuses 500 may be an integrated system to be mounted within the computer environment. The heat transfer apparatuses 500 may be affixed to the liquid lines 604. The liquid coolant system 602 with the heat transfer apparatuses 500 may installed into the computer environment as an after-market accessory. The liquid coolant system 602 with the heat transfer apparatuses 500 may be designed such that the liquid coolant system 602 with the heat transfer apparatuses 500 may be installed into the computer environment without conflict with components of the computer environment.

The liquid coolant system 602 with the heat transfer apparatuses 500 may be communicatively coupled with the circuitry of the computer environment, allowing the computer environment to control operation of the liquid coolant system 602 and/or the heat transfer apparatuses 500. The circuitry of the computer environment may utilize sensors of the computer environment for determination of when to activate the heat transfer apparatuses 500 and/or have the liquid coolant system 602 circulate the liquid.

In other embodiments, the liquid coolant system 602 and/or the heat transfer apparatuses 500 may rely on the power supply or be independent from the circuitry of the computer environment. The liquid coolant system 602 and/or the heat transfer apparatuses 500 may include their own control circuitry for determination of when to activate the heat transfer apparatuses 500 and/or have the liquid coolant system 602 circulate the liquid.

FIG. 8 illustrates an example liquid coolant system 800 that implements an example heat transfer apparatus 802, according to various embodiments. The example liquid coolant system 800 may include one or more of the features of the liquid coolant system 202 (FIG. 2 and FIG. 3) and/or the liquid coolant system 602 (FIG. 6 and FIG. 7), including the liquid lines, the heat exchanger, or some combination thereof.

The heat transfer apparatus 802 may include a thermally-conductive body 804. The thermally-conductive body 804 may include one or more of the features of the thermally-conductive body 102 (FIG. 1).

The thermally-conductive body 804 may be a heat spreader. The thermally-conductive body 804 may include one or more fins, wherein the one or more fins may be thermally coupled to one or more components to be cooled by the heat transfer apparatus 802. The components may be one or more memory devices. The memory devices may be dual-inline memory modules. The thermally-conductive body 804 may receive heat transferred from the components and may transfer the heat away from the components.

The heat transfer apparatus 802 may include a cold plate 806. The cold plate 806 may include one or more of the features of the cold plate 104 (FIG. 1). The cold plate 806 may include a coupling portion 808. The coupling portion 808 may include one or more of the features of the coupling portion 106 (FIG. 1). The coupling portion 808 may thermally couple the cold plate 806 to the liquid lines 810 of the liquid coolant system 800. The coupling portion 808 may facilitate transfer of heat from the cold plate 806 to the liquid lines 810.

The heat transfer apparatus 802 may include a TEC 812. The TEC 812 may include one or more of the features of TEC 108 (FIG. 1). The TEC 812 may be thermally coupled to the thermally-conductive body 804 on a first side of the TEC 812 and thermally coupled to the cold plate 806 on a second side of the TEC 812. The second side of the TEC 812 may be opposite to the first side of the TEC 812.

The TEC 812 may increase a rate and/or amount of heat transfer from the thermally-conductive body 804 to the cold plate 806 in response to energy being provided to the TEC 812. The TEC 812 may maintain, or attempt to maintain, a temperature differential between the first side of the TEC 812 and the second side of the TEC 812. The provision of energy to the TEC 812 and/or the amount of energy provided to the TEC 812 may be in accordance with one or more of the procedures for provision of energy to the TEC 108 and/or the amount of energy provided to the TEC 108 described in relation to computer environment 200 (FIG. 2).

Due to the temperature differential, the first side of the TEC 812 (referred to as 'the cold side') may be cooler than the second side of the TEC 812 (referred to as 'the hot side'). In order to maintain, or attempt to maintain, the temperature differential, the TEC 812 transfers heat from the cold side to the hot side. Due to this heat transfer from the cold side to the hot side, the TEC 812 may increase the rate and/or amount of heat transfer from the thermally-conductive body 804 to the cold plate 806.

The cold plate 806 may transfer the heat received from the TEC 812 to the liquid lines 810. The liquid coolant system 800 may circulate liquid within the liquid lines 810. The liquid may receive the heat transferred from the cold plate 806 to the liquid lines 810 and carry the heat away from the heat transfer apparatuses 802. Control of the circulation of the liquid and/or cooling of the liquid may be performed in accordance with the one or more of the procedures for control of circulation of the liquid and/or cooling of the liquid described in relation to the computer environment 200 (FIG. 2) and/or the liquid coolant system 212 (FIG. 3).

The heat transfer apparatuses 802 may be mounted into a computer environment, such as the computer environment 200 (FIG. 2) and/or the computer environment 600 (FIG. 6), and coupled to the liquid coolant system 800 after the liquid coolant system 800 has been installed in the computer environment.

In other embodiments, the liquid coolant system 800 with the heat transfer apparatuses 802 may be an integrated system to be mounted within the computer environment. The heat transfer apparatuses 802 may be affixed to the liquid lines 810. The liquid coolant system 800 with the heat transfer apparatuses 802 may installed into the computer environment as an after-market accessory. The liquid coolant system 800 with the heat transfer apparatuses 802 may be designed such that the liquid coolant system 800 with the heat transfer apparatuses 802 may be installed into the computer environment without conflict with components of the computer environment.

The liquid coolant system 800 with the heat transfer apparatuses 802 may be communicatively coupled with the circuitry of the computer environment, allowing the computer environment to control operation of the liquid coolant system 800 and/or the heat transfer apparatuses 802. The circuitry of the computer environment may utilize sensors of the computer environment for determination of when to activate the heat transfer apparatuses 802 and/or have the liquid coolant system 800 circulate the liquid.

In other embodiments, the liquid coolant system 800 and/or the heat transfer apparatuses 802 may rely on the power supply or be independent from the circuitry of the computer environment. The liquid coolant system 800 and/or the heat transfer apparatuses 802 may include their own control circuitry for determination of when to activate the heat transfer apparatuses 802 and/or have the liquid coolant system 800 circulate the liquid.

While the heat transfer apparatus 100, the heat transfer apparatus 500, and the heat transfer apparatus 802 have been described throughout as being utilized in separate computer environments and/or separate computer environment layouts, it is to be understood that the heat transfer apparatus 100, the heat transfer apparatus 500, the heat transfer apparatus 802, or some combination thereof may be utilized in a single computer environment.

Figure 9:
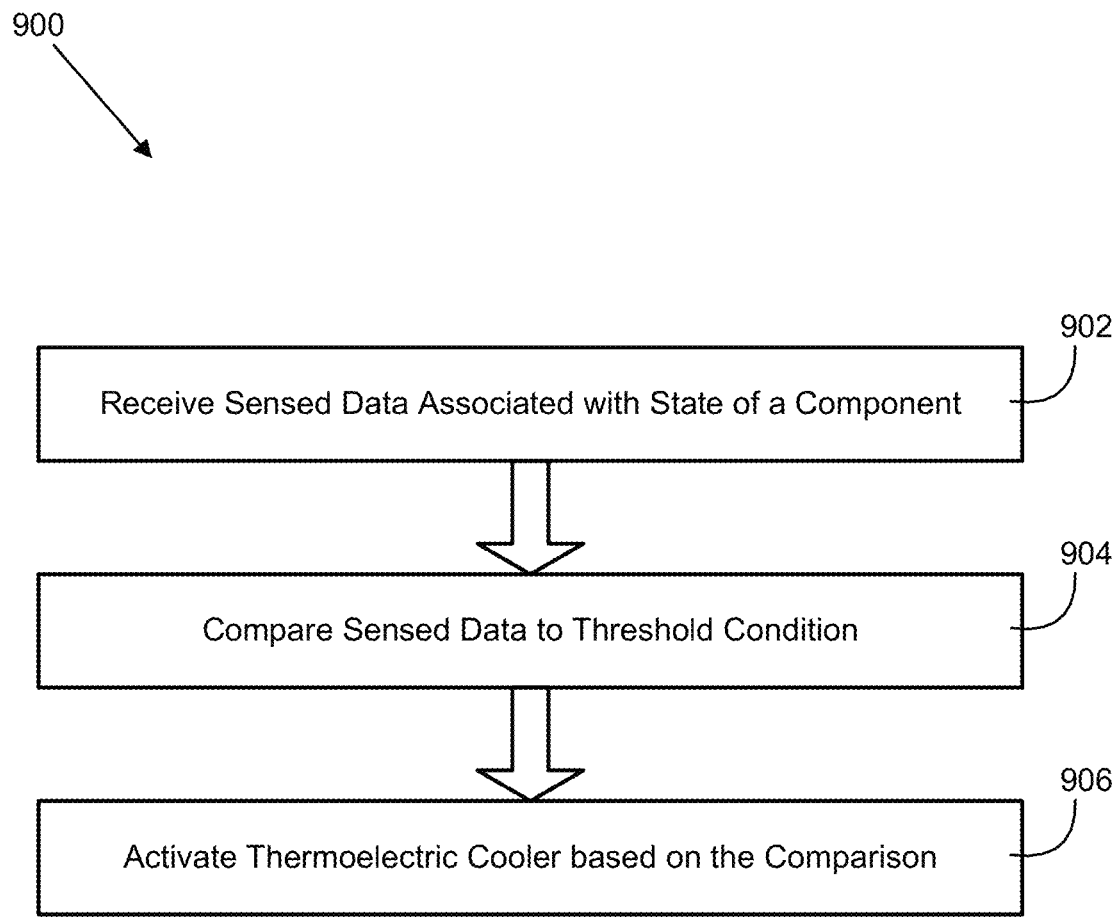
FIG. 9 illustrates an example procedure for activation of heat transfer apparatuses of the present disclosure, according to various embodiments.

FIG. 9 illustrates an example procedure 900 for activation of heat transfer apparatuses of the present disclosure, according to various embodiments. The procedure 900 may be implemented using the heat transfer apparatus 100 (FIG. 1), the heat transfer apparatus 500 (FIG. 5), the heat transfer apparatus 802 (FIG. 8), or some combination thereof. The procedure may be implemented by a device, including the computer environment 200 (FIG. 2), the liquid coolant system 202 (FIG. 2 and FIG. 3), the computer environment of the computer environment layout 400 (FIG. 4), the computer environment 600 (FIG. 6), the liquid coolant system 602 (FIG. 6 and FIG. 7), the liquid coolant system 800, or some combination thereof. In some embodiments, a computer-readable medium may include instructions that, when executed by a device, cause the device to perform one or more of the features of the procedure 900.

In 902, the device may receive sensed data associated with a state of a component of a computer environment. The sensed data may include a temperature of the component, a level of operation of the component, or some combination thereof. In some embodiments, the sensed data may include a memory junction temperature of the component and/or a chipset junction temperature of the component.

The component may be a component to be cooled by one or more of the heat transfer apparatuses to be activated by the procedure 900. The component may be a memory device of the computer environment. In some embodiments, the component may be a dual-inline memory module.

In some embodiments, the component may be a component to which the one or more heat transfer apparatuses are not specifically designed to cool. For example, the component may be a CPU of the computer environment that may be cooled by a coolant plate (such as coolant plate 210 (FIG. 2)) rather than by the heat transfer apparatuses.

In 904, the device may compare the sensed data to a threshold condition associated with the component. The threshold condition may be predetermined and may be a threshold temperature associated with the component, a threshold level of operation associated with the component, or some combination thereof. The threshold condition may be the threshold temperature, the threshold level of operation, or some combination thereof as described in relation to the heat transfer apparatus 100 (FIG. 1).

Based on the comparison, the device may determine whether the sensed data exceeds the threshold condition. In some embodiments, the device may further determine an amount by which the sensed data exceeds the threshold condition. The device may determine the amount by which the sensed data exceeds the threshold condition by determining a difference between the sensed data associated with the component and the threshold condition associated with the component.

In 906, the device may activate one or more of the heat transfer apparatuses based on the results of the comparison. The device may activate the heat transfer apparatuses by providing energy to the TEC of each of the heat transfer apparatuses. In response to the heat transfer apparatuses being activated, the heat transfer apparatuses may perform one or more of the operations described in relation to heat transfer apparatus 100, heat transfer apparatus 500, and/or heat transfer apparatus 802, including maintaining, or attempting to maintain, a temperature differential between a first side of the TEC and a second side of the TEC.

The device may activate the one or more of the heat transfer apparatuses in response to determining that the sensed data exceeds the threshold condition. In response to determining the sensed data exceeds the threshold condition, the device may provide a predetermined amount of energy to the TEC of each of the heat transfer apparatuses, which may activate the heat transfer apparatuses. If the device determines that the sensed data is less than or equal to the threshold condition, the device may maintain the heat transfer apparatuses in, or cause the heat transfer apparatuses to transition to, a deactivated state.

In some embodiments, the amount of energy provided to each of the TECs may be based on the amount that the sensed data exceeds the corresponding threshold condition. The amount of energy may be varied based on the amount that the sensed data exceeds the threshold condition, with the amount of energy provided being increased as the amount that the sensed data exceeds the threshold condition increases. The rate of heat transfer from the thermally-conductive body to the cold plate of the heat transfer apparatus may be varied based on the amount of energy provided to TEC of the heat transfer apparatus. The rate of heat transfer from the thermally-conductive body to the cold plate may be proportional to the amount of energy provided to the TEC.

In some embodiments, the activation of the heat transfer apparatuses may be based on the state of more than one component. In these embodiments, 902 and 904 may be performed for each of the components that the activation of the heat transfer apparatuses depend on. In 906, the device may activate the heat transfer apparatuses in response to the sensed data of all the components exceeding the corresponding threshold conditions, one of the components exceeding the corresponding threshold condition, or some portion of the components exceeding the corresponding threshold conditions. In some embodiments, the device may vary the amount of energy provided to each of the TECs based on a combined amount by which the sensed data of each of the components exceed the corresponding threshold conditions, that one of the components exceeds the corresponding threshold condition, or that some portion of the components exceed the corresponding threshold conditions.

In some embodiments, the one or more heat transfer apparatuses may be activated whenever the computer environment is in an on state. In 906 of these embodiments, the device may vary the amount of energy provided to each of the TECs based on the amount the sensed data of the component exceeds the threshold condition.

In some embodiments, the device may further control circulation of liquid within a liquid coolant system associated with the computer environment. In response to determining that the sensed data is less than or equal to the threshold condition, the device may cause the liquid coolant system to stop circulating the liquid within the liquid coolant system. In response to determining that the sensed data exceeds the threshold condition, the device may cause the liquid coolant system to circulate the liquid within the liquid coolant system.

Figure 10:
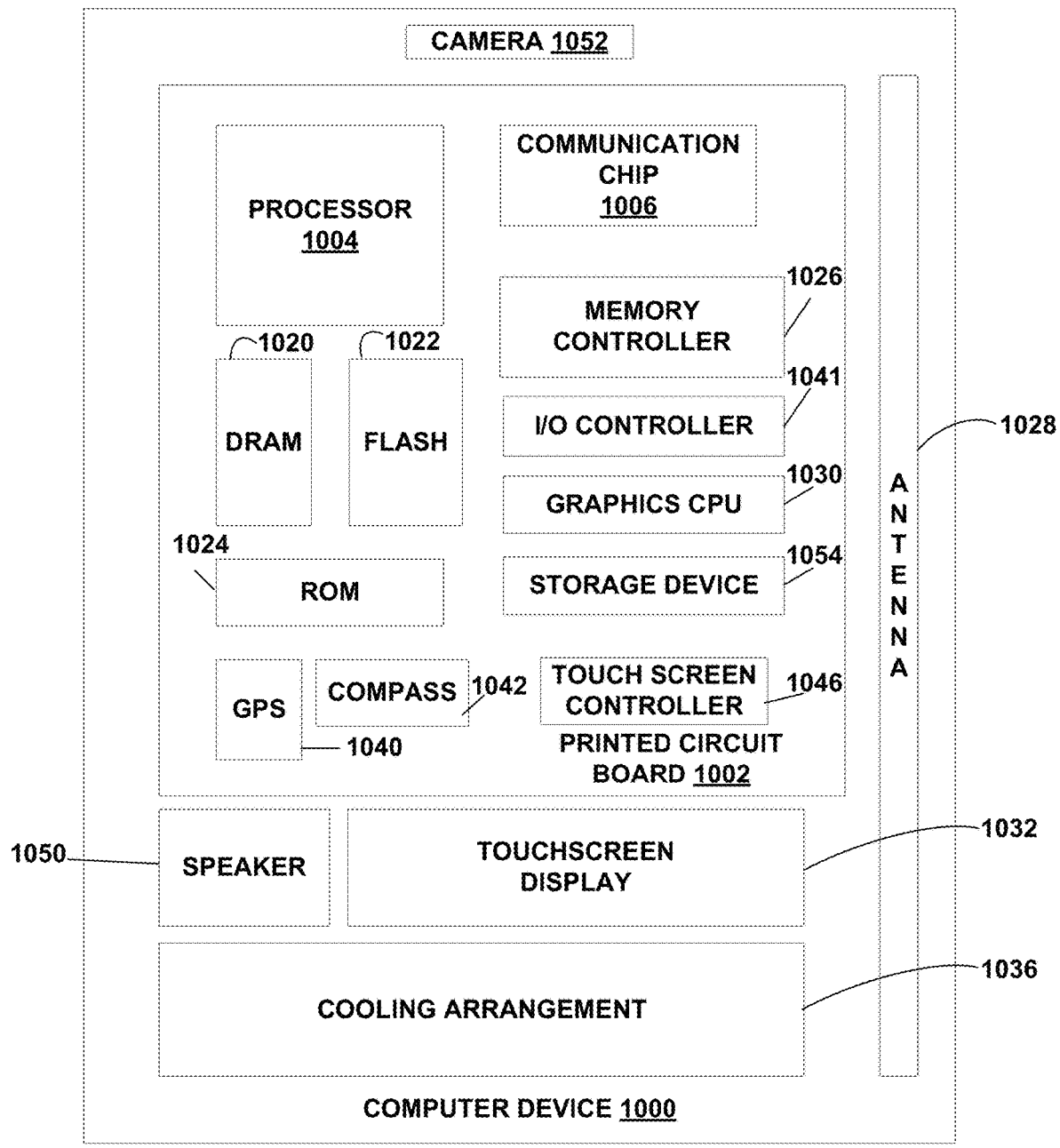
FIG. 10 illustrates an example computer device that may employ the apparatuses and/or methods described herein.

FIG. 10 illustrates an example computer device 1000 that may employ the apparatuses and/or methods described herein (e.g., the heat transfer apparatus 100 (FIG. 1), the computer environment 200 (FIG. 2), the liquid coolant system 202 (FIG. 2 and FIG. 3), the computer environment layout 400 (FIG. 4), the heat transfer apparatus 500 (FIG. 5), the computer environment 600 (FIG. 6), the liquid coolant system 602 (FIG. 6 and FIG. 7), the liquid coolant system 800 (FIG. 8), and/or the heat transfer apparatus 802 (FIG. 8)), in accordance with various embodiments. As shown, computer device 1000 may include a number of components, such as one or more processor(s) 1004 (one shown) and at least one communication chip 1006. In various embodiments, the one or more processor(s) 1004 each may include one or more processor cores. In various embodiments, the at least one communication chip 1006 may be physically and electrically coupled to the one or more processor(s) 1004. In further implementations, the communication chip 1006 may be part of the one or more processor(s) 1004. In various embodiments, computer device 1000 may include printed circuit board (PCB) 1002. For these embodiments, the one or more processor(s) 1004 and communication chip 1006 may be disposed thereon. In alternate embodiments, the various components may be coupled without the employment of PCB 1002.

Depending on its applications, computer device 1000 may include other components that may or may not be physically and electrically coupled to the PCB 1002. These other components include, but are not limited to, memory controller 1026, volatile memory (e.g., dynamic random access memory (DRAM) 1020), non-volatile memory such as read only memory (ROM) 1024, flash memory 1022, storage device 1054 (e.g., a hard-disk drive (HDD)), an I/O controller 1041, a digital signal processor (not shown), a crypto processor (not shown), a graphics processor 1030, one or more antenna 1028, a display (not shown), a touch screen display 1032, a touch screen controller 1046, an audio codec (not shown), a video codec (not shown), a global positioning system (GPS) device 1040, a compass 1042, an accelerometer (not shown), a gyroscope (not shown), a speaker 1050, a camera 1052, and a mass storage device (such as hard disk drive, a solid state drive, compact disk (CD), digital versatile disk (DVD)) (not shown), and so forth. Further, computer device 1000 may include cooling arrangement 1036, which may include (e.g., the heat transfer apparatus 100 (FIG. 1), the computer environment 200 (FIG. 2), the liquid coolant system 202 (FIG. 2 and FIG. 3), the computer environment layout 400 (FIG. 4), the heat transfer apparatus 500 (FIG. 5), the computer environment 600 (FIG. 6), the liquid coolant system 602 (FIG. 6 and FIG. 7), the liquid coolant system 800 (FIG. 8), and/or the heat transfer apparatus 802 (FIG. 8)).

In some embodiments, the one or more processor(s) 1004, flash memory 1022, and/or storage device 1054 may include associated firmware (not shown), operating system and application programming instructions configured to enable computer device 1000, in response to execution of the programming instructions by one or more processor(s) 1004, to operate any one of a number of applications known in the art, and/or practice all or selected aspects of the methods described herein. In various embodiments, these aspects may additionally or alternatively be implemented using hardware separate from the one or more processor(s) 1004, flash memory 1022, or storage device 1054.

The communication chips 1006 may enable wired and/or wireless communications for the transfer of data to and from the computer device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to IEEE 202.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 1000 may include a plurality of communication chips 1006. For instance, a first communication chip 1006 may be dedicated to shorter range wireless communications such as Wi-Fi and Bluetooth, and a second communication chip 1006 may be dedicated to longer range wireless communications such as GPS, EDGE, GPRS, CDMA, WiMAX, LTE, Ev-DO, and others.

In various implementations, the computer device 1000 may be a laptop, a netbook, a notebook, an ultrabook, a smartphone, a computer tablet, a personal digital assistant (PDA), an ultra-mobile PC, a mobile phone, a desktop computer, a server, a switch, a router, a gateway, a printer, a scanner, a monitor, a set-top box, an entertainment control unit (e.g., a gaming console or automotive entertainment unit), a digital camera, an appliance, a portable music player, or a digital video recorder. In further implementations, the computer device 1000 may be any other electronic device that processes data.

Figure 11:
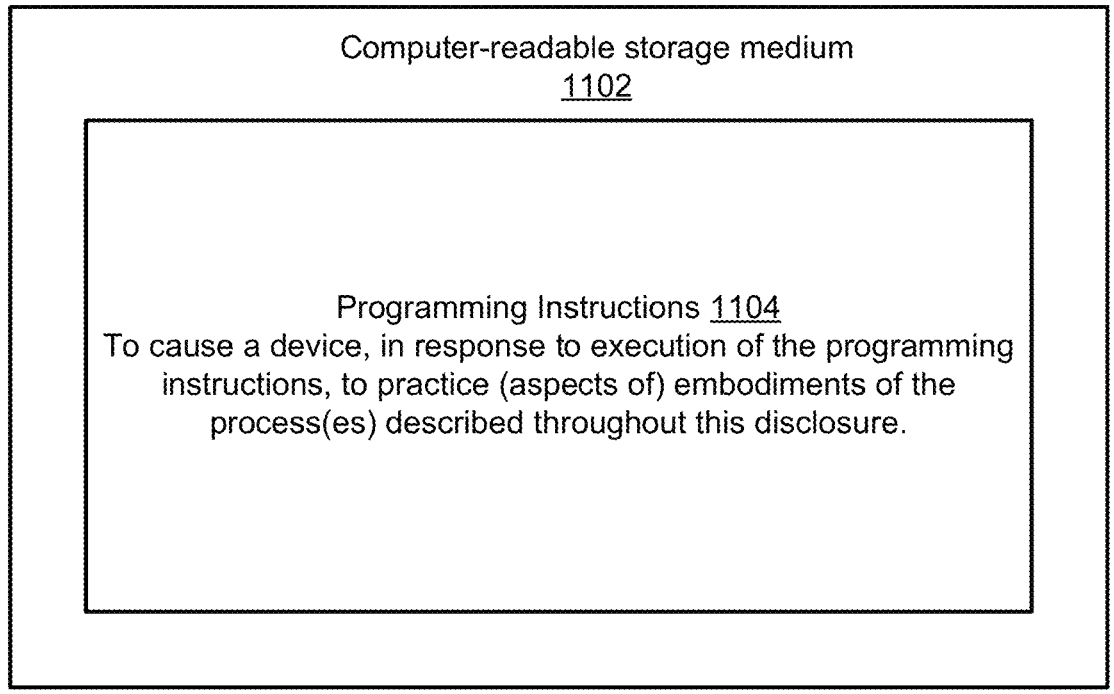
FIG. 11 illustrates an example computer-readable storage media that may store instructions, when executed by a processor, may employ and/or implement the apparatuses and/or methods described herein.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 11 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a device, e.g., computer device 900, in response to execution of the programming instructions, to implement (aspects of) the heat transfer apparatus 100 (FIG. 1), the computer environment 200 (FIG. 2), the liquid coolant system 202 (FIG. 2 and FIG. 3), the computer environment layout 400 (FIG. 4), the heat transfer apparatus 500 (FIG. 5), the computer environment 600 (FIG. 6), the liquid coolant system 602 (FIG. 6 and FIG. 7), the liquid coolant system 800 (FIG. 8), and/or the heat transfer apparatus 802 (FIG. 8). In alternate embodiments, programming instructions 1104 may be disposed on multiple computer-readable non-transitory storage media 1102 instead. In still other embodiments, programming instructions 1104 may be disposed on computer-readable transitory storage media 1102, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Example 1 may include an apparatus for selectively transferring of heat within a computer environment, comprising a cold plate thermally coupled to a liquid line of a liquid coolant system of the computer environment, the cold plate to transfer heat to the liquid line, a thermally-conductive body to cool a component of the computer environment, and a thermoelectric cooler (TEC) thermally coupled with the cold plate on a first side of the TEC and thermally coupled with the thermally-conductive body on a second side of the TEC, the TEC to increase an amount of heat transfer from the second side of the TEC to the first side of the TEC in response to energy provided to the TEC.

Example 2 may include the apparatus of example 1, wherein the thermally-conductive body includes a heat sink mounted within the computer environment, the heat sink to be cooled based on the increase in the amount of heat transfer by the TEC, and wherein the heat sink is to cool air within the computer environment.

Example 3 may include the apparatus of example 2, wherein the heat sink is located between a fan that directs air into the computer environment and the component of the computer environment, the heat sink to cool the air from the fan prior to contact between the air and the component.

Example 4 may include the apparatus of example 1, wherein the thermally-conductive body includes a heat spreader that is thermally coupled to the component of the computer environment, the heat spreader to be cooled based on the increase in the amount of heat transfer by the TEC.

Example 5 may include the apparatus of example 4, further comprising thermal interface material (TIM) that thermally couples the heat spreader to the component, the TIM located between the heat spreader and the component.

Example 6 may include the apparatus of any of one of examples 1-5, further comprising the liquid coolant system to selectively move liquid through the liquid line based on a temperature of the component of the computer environment.

Example 7 may include the apparatus of any of one of examples 1-5, further comprising the liquid coolant system to selectively move liquid through the liquid line based on a level of operation of the component of the computer environment.

Example 8 may include the apparatus of any of one of examples 1-5, wherein an amount of the energy provided to the TEC is varied based on a temperature of the component of the computer environment, and wherein the amount of heat transfer from the second side to the first side is proportional to the amount of energy provided to the TEC.

Example 9 may include the apparatus of any of one of examples 1-5, wherein the wherein an amount of the energy provided to the TEC is varied based on a level of operation of the component of the computer environment, and wherein the amount of heat transfer from the second side to the first side is proportional to the amount of energy provided to the TEC.

Example 10 may include the apparatus of any of one of examples 1-5, wherein the computer environment is a server chassis.

Example 11 may include the apparatus of any of one of examples 1-5, wherein the component is a memory device.

Example 12 may include a method for selectively cooling at least one component within a computer environment, comprising sensing for a condition precedent associated with a desire to cool the at least one component, determining that the condition precedent exists, and providing energy to a thermoelectric cooler (TEC) in response to determining that the condition precedent exists, the TEC being thermally coupled to a cold plate and a thermally-conductive body, the cold plate being thermally coupled to a liquid line of liquid coolant system of the computer environment and to transfer heat to the liquid line, the thermally-conductive body being employed to cool the at least one component, and the TEC increasing a rate of heat transfer from the thermally-conductive body to the cold plate based on the energy being provided.

Example 13 may include the method of example 12, wherein the TEC is thermally coupled to the cold plate on a hot side of the TEC and the thermally-conductive body on a cold side of the TEC, and wherein the TEC increases the rate of heat transfer by generating a heat differential between the hot side of the TEC and the cold side of the TEC in response to the energy provided, the hot side of the TEC transferring heat to the cold plate and the cold side cooling the thermally-conductive body.

Example 14 may include the method of example 12, wherein the condition precedent is that a temperature of the at least one component exceeds a threshold temperature, and wherein the energy being provided to the TEC is based on the temperature exceeding the threshold temperature.

Example 15 may include the method of example 14, further comprising varying an amount of the energy being provided to the TEC based on an amount that the temperature of the at least one component exceeds the threshold temperature, wherein the amount of the energy being provided to the TEC varies the rate of heat transfer from the thermally-conductive body to the cold plate.

Example 16 may include the method of example 12, wherein the condition precedent is that a level of operation of the at least one component exceeds a threshold level of operation, and wherein the energy being provided to the TEC is based on the level of operation exceeding the threshold level of operation.

Example 17 may include the method of example 16, further comprising varying an amount of the energy provided to the TEC based on an amount that the level of operation of the at least one component exceeds the threshold level of operation, wherein the amount of the energy being provided to the TEC varies the rate of heat transfer from the thermally-conductive body to the cold plate.

Example 18 may include the method of example 12, further comprising moving liquid through the liquid line in response to determining that the condition precedent exists, wherein the liquid transports the heat transferred from the cold plate to the liquid line away from the cold plate.

Example 19 may include the method of example 12, further comprising directing, by at least one fan, air towards the at least one component in response to determining that the condition precedent exists, wherein the thermally-conductive body is located between the at least one fan and the at least one component, and wherein the thermally-conductive body cools the air prior to the air contacting the at least one component.

Example 20 may include the method of example 12, further comprising measuring a state of another component within the computer environment, and varying the amount of the energy being provided to the TEC based on the state of the another component, wherein the amount of the energy being provided to the TEC varies the rate of heat transfer from the thermally-conductive body to the cold plate.

Example 21 may include the method of example 20, wherein the another component is a computer processing unit (CPU) of the computer environment, the CPU being cooled by the liquid coolant system, and wherein the state of the CPU includes a temperature of the CPU.

Example 22 may include the method of any one of examples 12-21, wherein the thermally-conductive body is a heat spreader thermally coupled to the at least one component by a thermal interface material (TIM), the TIM being located between the heat spreader and the at least one component.

Example 23 may include one or more computer-readable media having instructions stored thereon, wherein the instructions, in response to execution by a device, cause the device to receive sensed data associated with a state of a component within a computer environment, compare the sensed data to a threshold condition associated with the state of the component, and activate a thermoelectric cooler (TEC) based on the comparison of the sensed data to the threshold condition, wherein the TEC is thermally coupled to a cold plate and a thermally-conductive body, with the cold plate thermally coupled to a liquid line of a liquid coolant system of the computer environment and to transfer heat to the liquid line, and the thermally-conductive body to cool the component, wherein the TEC is to increase a rate of heat transfer from the thermally-conductive body to the cold plate based on the activation of the TEC.

Example 24 may include the one or more computer-readable media of example 23, wherein the instructions, in response to execution by the device, cause the device to further determine, based on the comparison of the sensed data to the threshold condition, that the sensed data exceeds the threshold condition, wherein to activate the TEC includes to provide energy to the TEC in response to the determination that the sensed data exceeds the threshold condition.

Example 25 may include the one or more computer-readable media of example 23 or 24, wherein the TEC is thermally coupled to the cold plate on a hot side of the TEC and the thermally-conductive body on a cold side of the TEC, and wherein the TEC is to increase the rate of heat transfer through generation of a heat differential between the hot side of the TEC and the cold side of the TEC in response to the energy provided, and the hot side of the TEC is to transfer heat to the cold plate and the cold side is to cool the thermally-conductive body.

Example 26 may include the one or more computer-readable media of example 23 or 24, wherein the sensed data includes a temperature of the component, and wherein the threshold condition includes a threshold temperature.

Example 27 may include the one or more computer-readable media of example 26, wherein the instructions, in response to execution by the device, cause the device to further determine, based on the comparison of the temperature of the component to the threshold temperature, that the temperature of the component exceeds the threshold temperature, wherein the TEC is activated in response to the determination that the temperature of the component exceeds the threshold temperature.

Example 28 may include the one or more computer-readable media of example 27, wherein the instructions, in response to execution by the device, cause the device to further vary the rate of heat transfer from the thermally-conductive body to the cold plate based on a determined difference between the temperature of the component and the threshold temperature, the rate of heat transfer varied through provision of varied amounts of energy to the TEC.

Example 29 may include the one or more computer-readable media of example 23 or 24, wherein the sensed data includes a level of operation of the component, and wherein the threshold condition includes a threshold level of operation.

Example 30 may include the one or more computer-readable media of example 29, wherein the instructions, in response to execution by the device, cause the device to further determine, based on the comparison of the level of operation of the component to the threshold level of operation, that the level of operation of the component exceeds the threshold level of operation, wherein the TEC is activated in response to the determination that the level of operation of the component exceeds the threshold level of operation.

Example 31 may include the one or more computer-readable media of example 30, wherein the instructions, in response to execution by the device, cause the device to further:

vary the rate of heat transfer from the thermally-conductive body to the cold plate based on a determined difference between the level of operation of the component and the threshold level of operation, the rate of heat transfer varied through provision of varied amounts of energy to the TEC.

Example 32 may include the one or more computer-readable media of example 23 or 24, wherein the instructions, in response to execution by the device, cause the device to further move liquid through the liquid line based on the comparison of the sensed data to the threshold condition, wherein the liquid transports the heat transferred from the cold plate to the liquid line away from the cold plate.

Example 33 may include the one or more computer-readable media of example 23 or 24, wherein the instructions, in response to execution by the device, cause the device to further direct, by a fan, air towards the component based on the comparison of the sensed data to the threshold condition, wherein the thermally-conductive body is located between the fan and the component, and wherein the thermally-conductive body cools the air prior to contact between the air and the component.

Example 34 may include the one or more computer-readable media of example 23 or 24, wherein the instructions, in response to execution by the device, cause the device to further measure a state of a second component within the computer environment, and vary the rate of heat transfer from the thermally-conductive body to the cold plate based on the state of the second component, the rate of heat transfer varied through provision of varied amounts of energy to the TEC.

Example 35 may include the one or more computer-readable media of example 34, wherein the second component is a computer processing unit (CPU) of the computer environment, the CPU cooled by the liquid coolant system, and wherein the state of the CPU includes a temperature of the CPU.

Example 36 may include the one or more computer-readable media of example 23 or 24, wherein the thermally-conductive body is a heat spreader thermally coupled to the component by a thermal interface material (TIM), the TIM located between the heat spreader and the component.

Example 37 may include an apparatus for selectively transferring heat within a computer environment, comprising means for cooling a component of the computer environment, means for increasing an amount of heat transfer from the means for cooling in response to energy provided to the means for increasing the amount of heat transfer, wherein the means for increasing has a first side coupled to the means for cooling, and wherein the means for increasing is to increase a rate of heat transfer from the first side to a second side of the means for increasing in response to the energy provided to the means for increasing, and means for transferring heat from the second side of the means for increasing to a liquid line of a liquid coolant system of the computer environment.

Example 38 may include the apparatus of example 37, wherein the means for cooling is to be cooled based on the increase in the rate of heat transfer by the means for increasing, and wherein the means for cooling is to cool air within the computer environment.

Example 39 may include the apparatus of example 38, wherein the means for cooling is located between a fan that directs air into the computer environment and the component of the computer environment, the means for cooling to cool the air from the fan prior to contact between the air and the component.

Example 40 may include the apparatus of any one of examples 37-39, wherein the means for cooling is thermally coupled to the component of the computer environment, the means for cooling to be cooled based on the increase in the rate of heat transfer by the means for increasing.

Example 41 may include the apparatus of example 40, further comprising means for thermally coupling the means for cooling to the component, the means for thermally coupling located between the means for cooling and the component.

Example 42 may include the apparatus of any one of examples 37-39, wherein the liquid cooling system is to selectively move liquid through the liquid line based on a temperature of the component of the computer environment.

Example 43 may include the apparatus of any one of examples 37-39, wherein the liquid cooling system is to selectively move liquid through the liquid line based on a level of operation of the component of the computer environment.

Example 44 may include the apparatus of any one of examples 37-39, wherein an amount of the energy provided to the means for increasing the amount of heat transfer from the means for cooling is varied based on a temperature of the component of the computer environment, and wherein the rate of heat transfer from the first side to the second side is proportional to the amount of the energy provided to the means for increasing.

Example 45 may include the apparatus of any one of examples 37-39, wherein the wherein an amount of the energy provided to the means for increasing the amount of heat transfer from the means for cooling is varied based on a level of operation of the component of the computer environment, and wherein the rate of heat transfer from the first side to the second side is proportional to the amount of the energy provided to the means for increasing.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An electronic device comprising:
   a first thermoelectric cooler (TEC) to remove heat from a first component of one or more components of the electronic device, wherein the first TEC is variably controllable based on a change to an amount of energy provided to the first TEC, and wherein the first TEC is activated based on an identification that a level of operation of the first component exceeds a threshold level of operation of the first component;
   a second TEC to remove heat from a second component of the one or more components, wherein the second TEC is variably controllable based on a change to an amount of energy provided to the second TEC, and wherein the second TEC is activated based on an identification that a level of operation of the second component exceeds a threshold level of operation of the second component; and
   a liquid coolant system coupled with the first TEC, wherein the liquid coolant system is to remove heat from the first TEC;
   wherein the change to the amount of energy provided to the first TEC is dynamic and is controllable individually of the change to the amount of energy provided to the second TEC.

2. The electronic device of claim 1, wherein the change in amount of energy provided to the first TEC changes a thermal conductivity of the first TEC.

3. The electronic device of claim 1, wherein the change to the amount of energy provided to the first TEC includes a change in voltage, a change in current, or a change in wattage.

4. The electronic device of claim 1, wherein the change to the amount of energy provided to the first TEC is based on a change in temperature of the one or more components.

5. The electronic device of claim 1, wherein the first TEC includes:
   a first substrate material;
   a second substrate material;
   a conductive N-type material at least partially between the first substrate material and the second substrate material; and
   a conductive P-type material at least partially between the first substrate material and the second substrate material.

6. The electronic device of claim 1, wherein at least one of the one or more components is a memory or a processor.

7. The electronic device of claim 1, wherein the electronic device is a server chassis.

8. The electronic device of claim 1, wherein the liquid coolant system is mounted on a same chassis as a chassis to which the one or more components are to be mounted.

9. A method comprising:
   comparing, by one or more processors of an electronic device, a level of operation of a first component of one or more components of the electronic device to a threshold level of operation of the first component;
   comparing, by the one or more processors, a level of operation of a second component of the one or more components of the electronic device to a threshold level of operation of the second component;
   changing, by the one or more processors of the electronic device based on the comparison of the level of operation of the first component to the threshold level of operation of the first component, an amount of energy provided to a first thermoelectric cooler (TEC) that is to change a temperature of the first component by removing heat from the first component to a liquid coolant system coupled with the first TEC; and
   changing, by the one or more processors of the electronic device based on the comparison of the level of operation of the second component to the threshold level of operation of the second component, an amount of energy provided to a second TEC that is to change a temperature of the first component;

wherein changing the amount of energy provided to the second TEC is dynamic and individually controllable from changing the amount of energy provided to the first TEC.

10. The method of claim 9, wherein changing the amount of energy provided to the first TEC includes changing a voltage, current, or wattage provided to the first TEC.

11. The method of claim 9, wherein the first TEC includes:
a first substrate material;
a second substrate material;
a conductive N-type material at least partially between the first substrate material and the second substrate material; and
a conductive P-type material at least partially between the conductive N-type material and the first substrate material.

12. The method of claim 9, wherein the components include a memory or a processor.

13. The method of claim 9, wherein changing the amount of energy of the first TEC changes a thermal conductivity of the first TEC.

14. The method of claim 9, wherein at least one of the one or more components is a memory or a processor.

15. One or more non-transitory computer-readable media comprising instructions that, upon execution of the instructions by one or more processors of an electronic device, are to cause the electronic device to:
change, based on an identification that a level of operation of a first component of the electronic device has exceeded a threshold level of operation of the first component, an amount of energy provided to a first thermoelectric cooler (TEC) that is to change a temperature of the first component by removing heat from the first component to a liquid coolant system coupled with the first TEC; and
change, based on an identification that a level of operation of a second component of the electronic device has exceeded a threshold level of operation of the second component, an amount of energy provided to a second TEC that is to change a temperature of the second component;

wherein changing the amount of energy provided to the second TEC is dynamic and individually controllable from changing the amount of energy provided to the first TEC.

16. The one or more non-transitory computer-readable media of claim 15, wherein changing the amount of energy provided to the first TEC includes changing a voltage, current, or wattage provided to the first TEC.

17. The one or more non-transitory computer-readable media of claim 15, wherein the first TEC includes:
a first substrate material;
a second substrate material;
a conductive N-type material at least partially between the first substrate material and the second substrate material; and
a conductive P-type material at least partially between the conductive N-type material and the first substrate material.

18. The one or more non-transitory computer-readable media of claim 15, wherein the components include a memory or a processor.

19. The one or more non-transitory computer-readable media of claim 15, wherein changing the amount of energy of the first TEC changes a thermal conductivity of the first TEC.

20. The electronic device of claim 1, wherein the threshold level of operation of the first component is based on a percentage of a maximum level of operation of the first component.

* * * * *